(12) United States Patent
Sanders et al.

(10) Patent No.: US 6,574,605 B1
(45) Date of Patent: Jun. 3, 2003

(54) METHOD AND SYSTEM FOR STRATEGIC SERVICES ENTERPRISE WORKLOAD MANAGEMENT

(75) Inventors: Barbara Sanders, Canyon Lake, TX (US); Curtis Robb, Hagerstown, MD (US); Jet Gau, Hagerstown, MD (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 09/441,443

(22) Filed: Nov. 17, 1999

Related U.S. Application Data

(60) Provisional application No. 60/108,876, filed on Nov. 17, 1998.

(51) Int. Cl.[7] .............................. G06F 17/60; H04M 3/00
(52) U.S. Cl. ...................... 705/8; 705/7; 705/9; 705/34; 705/38; 705/40; 379/265.01; 379/265.02; 379/265.06
(58) Field of Search ............... 705/7, 8, 9, 34, 705/38, 40; 379/265.01, 265.02, 265.06

(56) References Cited

U.S. PATENT DOCUMENTS

| 5,111,391 | A | 5/1992 | Fields et al. ............... 364/401 |
|---|---|---|---|
| 5,182,705 | A | 1/1993 | Barr et al. .................. 364/401 |
| 5,185,780 | A | 2/1993 | Leggett ........................ 379/34 |
| 5,289,368 | A | 2/1994 | Jordan et al. ............... 364/401 |
| 5,325,292 | A | 6/1994 | Crockett ..................... 364/401 |
| 5,416,694 | A | 5/1995 | Parrish et al. .............. 364/401 |
| 5,467,268 | A | 11/1995 | Sisley et al. ................ 364/401 |
| 5,493,489 | A | 2/1996 | Tamaki et al. ............. 364/401 |
| 5,615,121 | A | 3/1997 | Babayev et al. ............ 395/209 |
| 5,619,695 | A | 4/1997 | Arbabi et al. .............. 395/670 |
| 5,737,728 | A | 4/1998 | Sisley et al. .................... 705/8 |
| 5,765,140 | A | 6/1998 | Knudson et al. .............. 705/9 |
| 5,768,506 | A | 6/1998 | Randell ................. 395/200.32 |
| 5,787,160 | A | 7/1998 | Chaney et al. ............. 379/220 |
| 5,799,286 | A | 8/1998 | Morgan et al. ............... 705/30 |
| 5,825,869 | A | 10/1998 | Brooks et al. ............... 379/265 |
| 5,826,020 | A | 10/1998 | Randell ................. 395/200.32 |
| 5,826,239 | A | 10/1998 | Du et al. ........................ 705/8 |
| 5,848,143 | A | 12/1998 | Andrews et al. ............ 379/219 |
| 5,852,809 | A | 12/1998 | Abel et al. ..................... 705/26 |
| 5,860,066 | A | 1/1999 | Rouse ............................. 705/1 |
| 5,878,398 | A | * 3/1999 | Tokuda et al. ......... 379/100.08 |
| 6,038,541 | A | * 3/2000 | Tokuda et al. ......... 379/100.08 |
| 6,041,306 | A | * 3/2000 | Du et al. ........................ 705/7 |
| 6,209,018 | B1 | * 3/2001 | Ben-Shachar et al. ...... 709/105 |
| 6,338,074 | B1 | * 1/2002 | Poindexter et al. ......... 707/500 |
| 6,393,455 | B1 | * 5/2002 | Eilert et al. .................. 709/104 |
| 6,401,073 | B1 | * 6/2002 | Tokuda et al. ................. 705/1 |

FOREIGN PATENT DOCUMENTS

EP 0793184 A2 * 9/1997

OTHER PUBLICATIONS

"IA Corp. will unveil work management software", Apr. 10, 1995, Business Wire p4101062, Dialog file 148, Accession No. 07797925.*

(List continued on next page.)

Primary Examiner—Tariq R. Hafiz
Assistant Examiner—Romain Jeanty
(74) Attorney, Agent, or Firm—Kilpatrick Stockton LLP; George T. Marcou

(57) ABSTRACT

The invention provides a system and method for strategic services enterprise workload management and more particularly to an automated method and system for enterprise workload management that enables an organization such as a financial institution to route any channel service to customer service representatives at any capable service site. Thus, the invention enables an organization to provide service to its customers at any time and by any communications or service channel a customer, chooses, wherein the enterprise workload management knows all work in process for a customer so that when a customer is identified, that customer will be routed to the first available agent that can best satisfy both the customer's intent and the organization's intent.

17 Claims, 11 Drawing Sheets

OTHER PUBLICATIONS

Georgakopoulos et al, An Overview of Workflow Management: From Process Modeling to Workflow Automation Infrastructure Distributed and Parallel Databases, 3, 119–153 (1995).*

Krisnakumar et al, "Managing Heterogeneous Multi–system Tasks to Support Enterprise–Wide Operations". Distributed and Parallel Databases, 1–33 (1995).*

Worforce Management for Multiplce Call Centers, Art Olender, IEX Corporation, http://www.iex.com/workforc1.htm.

IEX Provides TotalView Workforce Management to CIGNA HealthCare—CIGNA HealthCare Relies on TotalView to Manage 11 Call Centers Nationwide—, IEX Corporation, Recent Announcements, http://www.iex.com/cigna.htm.

* cited by examiner

METHOD AND SYSTEM FOR STRATEGIC SERVICES ENTERPRISE WORKLOAD MANAGEMENT

This application claims the benefit of U.S. Provisional Application No. 60/108,876, titled "METHOD AND SYSTEM FOR STRATEGIC SERVICE ENTERPRISE WORKLOAD MANAGEMENT", filed Nov. 17, 1998.

FIELD OF THE INVENTION

The present invention relates to automated workload management systems and in particular to a computerized method and system for globally managing all categories of work by an organization across physically separated multiple locations.

BACKGROUND OF THE INVENTION

Currently, the focus of an organization, such as a financial institution, for example, a bank, is to treat a request by one of its customers as a one time transactional event. The current customer support model is focused on supporting vertically aligned products and services, for example, credit cards versus bank accounts, along modes of customer contact, for example, ATM's and branches versus telephones, Internet and mail. More particularly, a single telephone command center located in one geographic area is used to attempt to coordinate all the telephone calls, such as all 800 service calls from all customers around the world. Such phone calls are distributed to service centers at other geographic locations, which is extremely time-consuming.

Furthermore, the customer service representatives or service professionals (SP's) at the service centers are not always available all of the time. For example, a particular SP may have to attend a meeting or a training session. Moreover, SP's may have to swap calls, depending on the different type of skill sets required for a customer calling in. For example, a customer might want to know about his or her current balance, or call in to increase his or her credit line or to respond to a bill collection issue or with a billing statement problem. It is necessary for those types of phone calls to be forwarded to different locations and different groups of SP's. Those types of problems are currently handled by a telephone command center in a single geographic location and all such problems are currently handled by human intervention.

In order to maximize the value of each customer contact to the financial institution and to furnish the financial institution the ability to manage the elements of the interaction with quality, consistency and efficiency, it is imperative for financial institutions to shift the focus to a model that leverages each customer contact. Thus, there is a need for a customer support model which reflects the customer's total value to the financial institution regardless of the mode of contact. In order to maximize the customer's value, the financial institution service model must be expanded to include customer sales support as well as efficient customer servicing. The actual access point the customer uses to enter the financial institution system should serve only to help qualify prioritization of the customer's request.

There is a further need for a computerized method and system of enterprise workload management which affords effective global management of all categories of work across multiple physically separated servicing locations that describes how work is initiated, regardless of service channel, and how work is identified, classified, tracked, managed, and processed, while simultaneously satisfying the financial institution's objectives, such as leveraging and selling, and achieving the maximum business volume at a minimum unit cost by prioritizing business objectives.

SUMMARY OF THE INVENTION

It is a feature and advantage of the present invention to provide an automated method and system for enterprise workload management that enables an organization to route any channel service to any capable service site to support service location independence.

It is a further feature and advantage of the present invention to provide such a method and system that enables an organization to provide services to customers at any time and by any communications channel the customer chooses, wherein the enterprise workload management knows all work in process for a customer so that when a customer is identified, that customer will be routed to the first available agent that can best satisfy both the customer's intent and the organization's intent.

It is a still further feature and advantage of the present invention to provide such a method and system which supports unlimited geographical service centers with highly scaleable features to accommodate future growth.

It is another feature and advantage of the present invention to provide such a method and system which replaces manual procedures with automated management tools to maximize the central management control and to minimize the cost of operation.

It is an additional feature and advantage of the present invention to provide such a method and system which maintains and monitors a service professional skill set and availability data at an enterprise level to support the dynamic resource allocation and workload assignment among geographic service centers.

It is also a feature and advantage of the present invention to provide such a method and system which provides real time monitoring of service channel traffic, staffing activities, average speed of answer, and handle time categories at the enterprise, site, unit, and individual levels. This monitoring provides real-time event notification when threshold controls specified by the enterprise operations are exceeded, wherein such notification generates alerts that trigger dynamic resource reallocation and workload assignments among geographical service centers.

It is still another feature and advantage of the present invention to provide such a method and system which collects management information and performance measurement with MIS (management information systems) reporting capability to support the continuous improvement process.

It is a further feature and advantage of the present invention to provide such a method and system which supports accurate volume forecasting to avoid unnecessary resource reallocation by reducing forecast unit intervals.

It is a still further feature and advantage of the present invention to provide such a method and system which incorporates human behavior into the management process in matching the right skill to the right service channel, distributing the right amount of requested service to the right SP, switching an SP from one service job to another service job at the right frequency, and furnishing advance notice with time allowance for switching an SP from one service job to another service job.

It is an additional feature and advantage of the present invention to provide such a method and system which retains historical data enterprise-wide to support planning and improvement processes.

It is still an additional feature and advantage of the present invention to provide such a method and system which supports a work item inventory mechanism to keep a record of a work item status from initiation to queuing, to active, to completion, and to ending with final storage in an enterprise archival system.

It is a still further feature and advantage of the present invention to provide such a method and system that supports customer contact history as data for personalization of the customer's future contact in order to assure a quick response and quality service.

It is another feature and advantage of the present invention to provide such a method and system that supports dynamic reprioritization of work with response time as high priority to assure that the system will respond to customer requests in a timely fashion.

It is yet another feature and advantage of the present invention to provide such a method and system that supports a customizable rules engine to manage the definition of business policies for the workload distribution.

It is also a feature and advantage of the present invention to provide such a method and system with 24 hours a day and 7 days a week operation.

To achieve the stated and other features, advantages and objects, an embodiment of the present invention utilizes a management software or platform to automate service center coordination between a plurality of sites and to arrange distribution of resources. The resources are SP's at various customer service centers. The resources are located at a number of sites, for example, at various locations in the United States, and there are a number of service channels, such as inbound and outbound telephone calls, sale of service for an all-bank call, and work items. Work items include, for example, fax, letter mail, internet e-mail and internally generated e-mail. All documents are scanned into electronic images, and the customer service center picks up the images through the system, and works at different locations. Thus, if the work images cannot be done in one service center, another SP in another service center can look into the system and processes such electronic work items.

In an embodiment of the present invention, the entire organization, such as a financial institution, is globalized for all different business units in order to pool, for example, all retail, student loan, mortgage, and credit card activities to enable them to be served by all service centers of the financial institution. A single SP is able to handle all different types of service calls. Computers are used to automate all the interfaces and to manage, coordinate, and reassign all telephone calls, electronic work items, and inbound and outbound calls. Computers are also used to distribute all the work items to all the SP's. The method and system includes other computer elements besides computerizing the calls. For example, the planning and overall control and the entire method and system is computerized.

In an embodiment of the present invention, from the point of view of the enterprise command center handling the enterprise workload management, planning is 18 months or 6 quarters ahead. It involves determining, for example, what type of service must be provided and how many customers the financial institution will have, what the customer content rate will be, and predicting what types of service will be needed. Planning also includes the different kinds of volume, such as call volume or e-mail volume and forecasting how many of each there will be. For long-range planning, the forecast is used to determine how many FTE's (full time equivalents), i.e., full-time SP's, and how many steps are needed to respond to such volume. Based on such planning, the financial institution can estimate in year quarterly forecasting how many FTE's will be needed on a quarterly basis and forecast the goal, for example, into the schedule or steps for the financial institution.

In an embodiment of the present invention, in the distributing environment, the financial institution's goal is to consolidate all its numerous service centers into a smaller number, such as 6 or 7 mega centers. The quarterly forecasting is used to determine how many steps will be located in the different mega centers. Quarterly planning involves different SP's to handle different types of customer service based upon whatever skill levels the SP's have. When the financial institution is doing the quarterly planning, it also determines the financial cost and includes finance approval, which involves interaction between departments of the financial institution. In addition to quarterly planning, the method and system of the present invention also performs weekly and daily plannings with a computer to support those types of planning. Planning is generally characterized as volume forecasting, scheduling, and staff scheduling, and is further characterized as enterprise site capacity planning.

In an embodiment of the present invention, a group of planning activities is administered in a workforce management process known as administration. Administration is a long-range execution, which means it is based on sub-hourly (e.g., half-hourly) intervals. There is traffic coming in through telephone calls, e-mail, mail image. Administration is needed to monitor on-line and make sure there is a balanced work load among all the sites and among all the groups of the SP's. It is a long-range environment in which those kinds of half-hourly execution results are produced.

In an embodiment of the present invention, the enterprise workload management system captures data from current execution results and forecasts planning volume. For example, the system captures and inventories data regarding the mailing of the billing statements and analyzes and predicts the volume of expected inbound phone calls, and on what day and at what time. The captured and inventoried information is used by the system to reschedule and plan for the particular day or week. When the system detects such an event, it makes an appropriate forecast. The forecasting can be done on a quarterly basis. If, for example, mailing of the billing statements is delayed by a day because of a problem in the statementing process, the data is entered into the system to effect appropriate scheduling changes. Other types of changes may likewise affect scheduling, and corresponding data is likewise entered into the system. The system then analyzes the data and redistributes all the instructions to all the sites and to all the SP's, for example to e-mail or to log into the inbound phone call application.

In an embodiment of the present invention, those types of execution results have long-range performance or management data that are collected and put into a database. The database is where the next phase, known as maintenance, is performed. The maintenance methodology maintains those types of data and all kinds of data in a data warehouse. Maintenance is characterized as a kind of analytical tool to pool all those types of data with those types of execution results and those types of forecasting data together to produce an MIS report. These types of information can be analyzed by the enterprise command center, and the enterprise command center personnel may suggest the need to redistribute volume to different locations or reschedule staff. In an embodiment of the present invention, those types of suggestions go, for example, to senior management for the improvement process. The improvement process includes simulations to run those suggestions and produce optimized results. The results are fed back to the planning process. Such feedback goes to the daily planning, which means for the next day follow-up of the execution plan. Those type of improvements also have weekly planning improvements, as well as for quarterly and for the long range. Accordingly, a complete loop is defined of the work force management.

Additional objects, advantages and novel features of the invention will be set forth in part in the description that follows, and in part will become more apparent to those skilled in the art upon examination of the following or upon learning by practice of the invention.

DETAILED DESCRIPTION OF THE INVENTION

Figure 1:
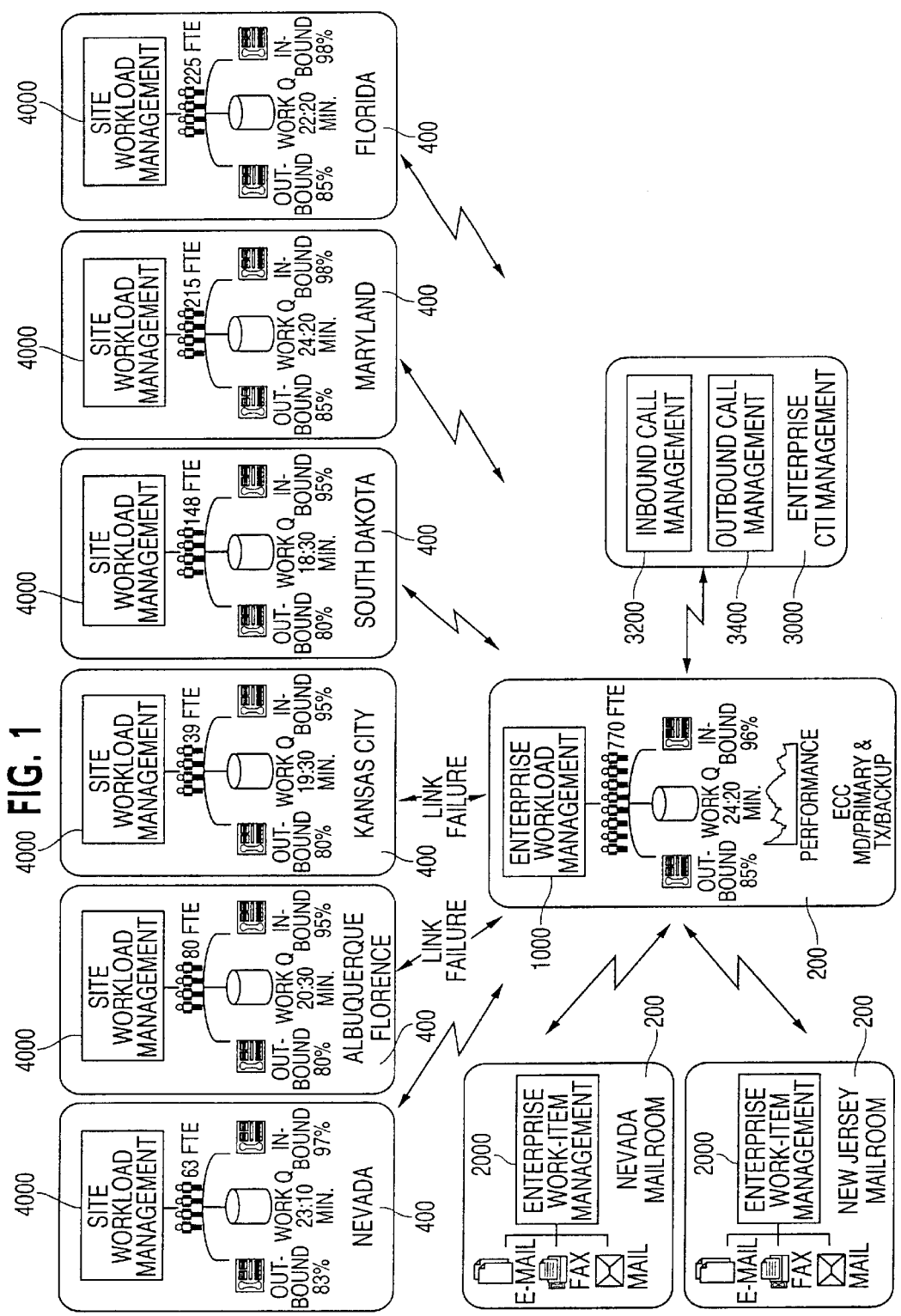
FIG. 1 depicts a strategic service enterprise workload management (EWM) system topology in accordance to an embodiment of the present invention.

Referring now in detail to an embodiment of the present invention, the method and system for strategic services enterprise workload management (EWM) has as its goal to achieve the maximum business volume at a minimum unit cost by efficiently prioritizing business objectives. To that end, the priorities of EWM range from customer service as the highest following with employee satisfaction, and then productivity. Since employee satisfaction directly impacts customer satisfaction and service productivity, it is defined as having a higher priority than productivity. Thus, the EWM design takes into consideration the human impact on behavior and treats it with the right management attention; for example, proactive versus reactive, right skill match to right task, distribution of the right amount of work to the SP, and the frequency of switching a SP from one work mode to another. Accordingly, the method and system for EWM is developed and implemented through planning, administration, maintenance, and improvement to achieve the above-stated goal. These four management and planning processes are discussed next.

Planning

In an embodiment of the present invention, planning is a look-ahead process with systemic methods rather than intuition. Planning involves determining, for example, what type of service must be provided and how many customers the financial institution will have, what the customer content rate will be, and predicting what types of service will be needed. The planning activities cover long-range, short-range, weekly, daily, session, and sub-hourly workforce plannings along with the budget approval procedure of the organization, such as a financial institution, to manage the total cost of delivery. Planning also includes the different kinds of volume, such as call volume or e-mail volume and forecasting how many of each there will be. For example, if the financial institution decides to support an e-mail service channel in 6 months, the EWM method and system provide a predictive mechanism to enable work force management planning. A system planner then enters a set of parameters, studies the data and obtains a calculated number of SP FTE's required to achieve a predefined level of customer service. If one of the parameters provides, for example, that a total of 30 FTE's are required to respond to an average of 20,000 e-mails on a daily basis, a scheduling mechanism will automatically create detailed work schedules based on the processing factors and service center scheduling rules. If the scheduling mechanism identifies, for example, that 10 additional FTE's are required with a particular skill set enterprise-wide, then the EWM method and system will review current and future requirements, other planned activities such as training and meetings, and apply overtime rules to provide the planner with staffing options to be considered. If no option is satisfactory, then the 10 additional FTE's are to be hired. The planner then submits request for budget approvals. Upon receiving the budget approval, the planner enters the additional resources to the scheduling database as a holding template with projected availability dates. The planner can then initiate the hiring and training processes. If approval is not received in a predetermined amount of time, the EWM method and system automatically generate an alert or e-mail to remind the planner that staffing cannot meet projected workloads.

With regard to long-range workforce planning, it is based on an accumulation of statistical data over an extended time period, such as 18 months or 6 quarters, in order to provide targeted forecast results. Thus, for the above example, the forecast results are used to determine how many FTE's and how many steps are needed. Based on such planning, the financial institution can estimate in year quarterly (i.e., short-range) forecasting how many FTE's will be needed on a quarterly basis and project such need into the schedule or steps for the financial institution. Furthermore, once such planning has been finally approved, it cannot be modified. However, it can be enhanced as a quarterly or short-range rolling plan with up-to-date modifications as needed. The long-range workforce planning produces the following output data: estimated volumes by skill; qualification of volumes for additional marketing initiatives; conversion of predicted work volumes to FTE required; establishment of capacity plans by site; factoring in vacation, systems enhancement/roll-out, hiring and training plans; buildout of call routing and workload distribution plans; and approvals and sign-offs. Here, a skill can be a service function or work type supported in each service channel, wherein the service channel can be decomposed into reasonable functional or business segments to provide accurate volume forecasts and staffing requirements. For example, functional segments can be common activities supported by all business segments such as account maintenance, disputes and collections; whereas, business segments can be a group of business specific services such as credit card or checking account processing.

To support long-range workforce planning, a short-range workforce planning is devised covering a quarterly period of 3 months. This planning is to be approved and filed each quarter, and a replicated copy of which is used for weekly workforce planning to establish the exact staffing needs for execution. In an embodiment of the present invention, in the distributing environment, the financial institution's goal is to consolidate all its numerous service centers into a smaller number, such as 6 or 7 mega centers. The quarterly forecasting is then used to determine how many steps will be located in these different mega centers. Quarterly planning involves different SP's to handle different types of customer service based upon whatever skill levels the SP's have. When the financial institution is doing the quarterly planning, it also determines the financial cost and includes finance approval, which involves interaction between departments. The outputs of the short-range workforce management include data such as updated volumes by skill; weekly workload distribution plan; overhead assumptions; updated/adjust for new marketing initiatives; updated FTE required; updated site capacity plans; updated vacation, systems enhancement/roll-out, hiring, and training plans; establishment of call routing and workload distribution plans; approvals and sign-offs; and creation of an initiatives calendar to begin the plan of record process. Although the long-range workforce planning is set for 18 months and the short-range workforce planning is set at 3 months or one-sixth of the long-range planning, it should be noted that such time periods for these plannings are merely functions of the financial institution's wants and needs. Thus, those time periods can take on different lengths, with the long-range period being a multiple of the short-range period. In addition to quarterly planning, the method and system of the present invention also performs weekly and daily planning with a computer to support those types of planning.

With regard to weekly workforce planning, it is established for each week within a quarter. As mentioned before, an actual weekly planning is a copy of short-range planning with up-to-date modifications. Modification to the weekly planning is not allowed once the weekly planning flows into an execution week. The outputs of the weekly workforce management include data such as % day distribution plan; weekend rotation schedule; day-off plan; staffing plan by site (build schedules); finalize initiatives calendar; training plan; development plan; team meetings; other non-call handling activities; call routing and workload distribution plans; and overtime requirements (with hiring frozen at this point).

With regard to daily, session, and sub-hourly workforce plannings, the period of time for each of such plannings is based on an overall organizational or enterprise calendar established by the financial institution as based on its desired parameters. For instance, a week can be defined as beginning on Monday and ends on Sunday and containing 7 calendar execution days, with each execution day containing a well-defined daily, session and sub-hourly workforce execution plan. When a plan becomes an execution plan, modification is not allowed. The outputs of the execution plan include data such as absence coverage plans; volumes by segment; monitor adherence to all plans, such as training plan, development plan, team meetings, and other non-call handling activities; monitor of average speed of answer (ASA) by segment; updated overtime requirements; and negotiate/balance initiative and staffing plans.

Administration

In an embodiment of the present invention, administration is a workforce management process that manages several planning time horizons from runtime sub-hourly execution up to long-range planning, wherein the sub-hourly workplan is used to manage and measure the activity of the runtime execution. These various workforce plannings and their relationship dependencies are as described above. Forecasting for these time frames require the input of historical data. For example, to forecast an 18 month work plan of service, the administration process references the relative 18 month historical work volumes and trended patterns to make the necessary adjustments with new business factors, such as an increase in the number of active customers supported from 25 million to 40 million.

Maintenance

In an embodiment of the present invention, maintenance includes the activities required to maintain planning and historical data, and to generate analytical and management reports for input into the result analysis and optimization activities in the Improvement process. The data categories for maintenance are summarized as follows: forecasted arrival volumes and pattern, predicted SP scheduling, runtime SP's activities management, real-time data collection, workload monitoring, service channel tracking and inventory, enterprise workload distribution and prioritization, and customer contact history. These maintenance items will be discussed in details later.

Improvement

In an embodiment of the present invention, Improvement is an on-going process that analyzes the data generated by executing workforce plannings or management. It applies root cause analysis to fine-tune the above workforce planning rules. The focus of the improvement process is to enhance the business objectives. It is a seamless integration process which combines manual intervention with automated technology tools. An improvement process is required for each of the other processes, and the output of each such process may require budget approvals.

FIG. 1 depicts the EWM system design as developed and implemented through the aforementioned management and planning processes, in accordance to one embodiment of the present invention. In this figure and subsequent figures, the same numbers are used throughout to designate features which are the same in all of the embodiments illustrated.

As shown in FIG. 1, the EWM system design includes an EWM system 1000 interfacing with a plurality of enterprise work-item management systems (EIM's) 2000, an enterprise computer telephone integration management (ECM) 3000 which includes an inbound call management (ICM) 3200 and an outbound call management (OCM) 3400, and a plurality of service centers where site workload management systems (SWM's) 4000 reside to provide the central point of workload monitoring and distribution control. The EWM system 1000 is managed by an enterprise command center (ECC) located in one location, such as Florida, as a primary site. There is also a backup EWM system (not shown) located in another location, such as Maryland, as a secondary site to avoid single point of failure and to provide continuity of business. To minimize the operational cost and to provide centralized control, most of the operating staff will be located at the primary ECC site performing day-to-day operations, and a small-size staff will be located at backup ECC site performing day-to-day maintenance. In the case of primary site disaster, the backup site will take over the operation control from the primary site, and the primary site operating staff will be relocated to the backup site to resume the normal operations.

The EIM's 2000 are located at a plurality of mailroom mega sites 200, which are situated in different locations, such as Nevada and New Jersey, to support work introduction via the service channel that handles work items. Smaller mailrooms also may be located at other sites. These EIM's 2000 transform those customer service requests that are received by the mailroom mega sites 200 to electronic work items and collaborate with the EWM system 1000 to distribute the work to customer service sites 400 where the SWM's 4000 reside. The workload distribution mechanism are implemented in the EWM system 1000 and will be detailed later. The work routing decisions are based on the amount of new work items to be processed, the active work-items in workqueues at each work site, and the performance measurements collected by the ECM system 1000 from the inbound call management (ICM) 3200 and outbound call management (OCM) 3400 of the ECM 3000. The distribution targets are based on the current workload and the required skills of SP's at work sites.

Although FIG. 1 shows the use of six mega service centers or work sites 4000, two mailroom mega sites 200, and an ECM site 3000 to carry out the workload of the financial institution, it should be noted that the number of these sites merely depends on the desires and needs of the particular financial institution that employs the EWM system design of the present invention. With regard to each mega work site 400, it is configured to handle customer services for a variety of products and business functions. For scaleability, the EWM system 1000 is designed to manage additional customer service sites to anticipate the need to handle new business acquisitions.

As illustrated in FIG. 1, the EWM system 1000 interfaces with the EIM's 2000, the ECM 3000, and the SWM's 4000 to keep track of resource activities, such as total signed-on SP's, inbound staff productivity, outbound staff productivity, and the forecasted time to complete the work items by type. The EWM system 1000 also monitors the availability and capacity of each work site 400 and distributes the workload accordingly. For example, if the EWM system 1000 detects that there are communications link failures in New Mexico, alerts would be generated and sent to the enterprise monitoring consoles and new work items would not be sent to Albuquerque. Once the communication link is recovered, the EWM monitor within the EWM system 1000 would be notified and work distribution to Albuquerque would resume. This scenario also applies to the interfaces to the EIM's 2000 and the ECM 3000.

Figure 2:
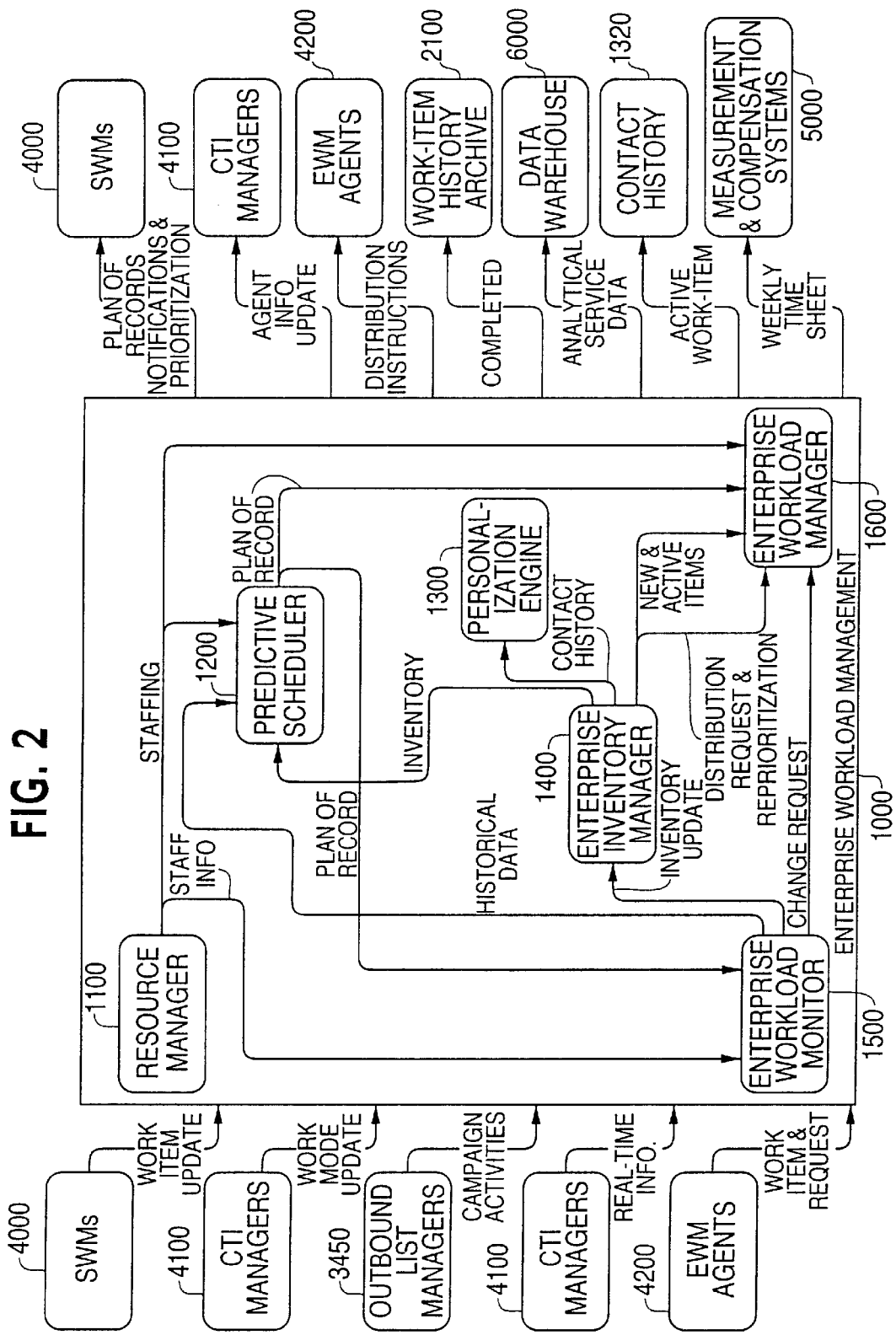
FIG. 2 depicts a functional model of the EWM system in accordance to an embodiment of the present invention.

FIG. 2 depicts a top-level functional model of the EWM system 1000, in accordance to an embodiment of the present invention. The model shows the EWM functional components 1100, 1200, 1300, 1400, 1500 and 1600 and their interrelationships, along with the EWM inputs and outputs and interfaces to external systems. For simplicity and visualization, the specific input or output interface connections to these EWM functional components are not included at this level yet, and they will be detailed later. For now, each of the EWM functional components is briefly described.

The resource manager component 1100 is responsible for administering a centralized repository of SP's. The repository is a database collection of detailed SP information referenced and updated by a computer telephone integration (CTI) manager located at each work site 400. The detailed SP information may include, for example, SP name, desktop IP address, skill set (e.g., specialties by service channel), sign-on and sign-off status, and any other information the financial institution deems relevant to identify and/or classify the SP's. Because the SP's may change modes from handling of inbound call to handling of outbound call or queued Work-items, the CTI managers at the work sites 400 are capable of capturing the sign-on, sign-off, and change-mode status of the SP's and provide updates to the resource manager 1100. As shown in the FIG. 2, the resource manager 1100 also provides resource information, as the control information to the predictive scheduler component 1200, enterprise workload manager component 1600, and enterprise workload monitor component 1500 of the EWM system 1000 to produce correct outputs.

The enterprise workload monitor 1500 is responsible for collecting, analyzing and reporting work performance information from all service channels. The monitor 1500 is also responsible for maintaining performance information as a historical MIS to support the aforementioned EWM management and planning processes. The historical information is maintained on workforce planning basis: sub-hourly, session, daily, weekly, short-range, and long-range. The enterprise workload monitor 1500 further provides a graphical user interface (GUI) allowing user requests for monitor displays, MIS reports, and modification to monitoring threshold controls. It also provides an enterprise-wide view for all the work sites 400, views of each specific work site, and views of each unit and SP's activities and productivity. The enterprise workload monitor 1500 outputs historical data as the reference control required for the predictive scheduler 1200 to produce correct forecasting. It also sends alerts as input to the enterprise workload manager 1600 to request resources reallocation or workload reassignment.

The enterprise inventory manager 1400 is responsible for tracking of active work-items to be completed. It only maintains the summary information about work items and not the actual images or contents of e-mail, fax, applications and letter mail. The actual images or other work-item contents are managed by the specific workqueue managers of the SWM's 4000 at the work sites 400. The priority of work items are initially assigned by channel (high to low): inbound call, e-mail, fax, outbound call, and letter mail. However, the EIM's 2000 may reprioritize work items on a periodic basis, as based on age and personalization criteria, to make sure customer requests meet established service level objectives. The enterprise inventory manager 1400 further outputs inventory counts, by type and age as input to the predictive scheduler 1200 to produce work plans of record. It also outputs new & active work item volumes as control data required by the enterprise workload manager 1600 to perform work item distributions.

The predictive scheduler 1200 is the EWM functional component that is responsible for facilitating future planning and runtime execution planning associated with workforce plannings. The main functions of the future planning are volume forecasting, schedule planning, staffing requirements, and cost estimation. The predictive scheduler 1200 automatically creates detailed work schedules based on forecasted demand and enterprise business calendar. It also accepts an existing set of resource availability schedules. It allows editing of these schedules and testing of the results. The predictive scheduler 1200 further receives historical data (MIS) and staffing information to produce plan of records as input to the enterprise workload monitor 1500 and enterprise workload manager 1600, as shown in FIG. 2.

The enterprise workload manager 1600 is responsible for balancing work assignments among service resources based on predefined prioritization rules at execution time. Using inputs from the resource manager 1100, the predictive scheduler 1200, and the enterprise workload monitor 1500, the enterprise workload manager 1600 recalculates SP resources allocations. Its implementation embeds a set of business logic that is customizable at runtime. These business rules prioritize resource reallocation options. The enterprise workload manager 1600 also allows editing of these rules and testing of the results. Furthermore, it can be triggered by an alert generated by the enterprise workload monitor 1500. Implicitly, the workload manager 1600 can also be triggered by a work-item distribution request generated by one of the EWM agents located at an EIM 2000. In order to perform workload management, the enterprise workload manager 1600 may require staffing information from the resource manager 1100, current plans of record from the predictive scheduler 1200, and new & active item volumes with age from the enterprise inventory manager 1400.

The contact management or contact history manager 1300 is responsible for recording customer contact history for future reference, and maintaining the data in a centralized contact history database for at least 6 months. Data are also summarized and archived for at least 8 months at a separate data warehouse. The contact history manager 1300 is also a customer service knowledge system that uses contact history data to promote a one-to-one relationship with customers of the financial institution and to provide quality service level. As shown in FIG. 2, the contact history manager 1300 retrieves contact history data from the enterprise Contact History Repository which has been updated by the inventory manager 1400 for status of work in-process items.

As indicated earlier, the EWM system 1000 comprises four external interfaces for interaction with four external systems: the EIM's 2000, the ICM 3200, the OCM 3400, and the SWM's 4000. The EWM relationships and interactions with external systems and its dependencies are as follows. An EWM agent 4200, as shown in FIG. 2, is implemented and located at each EIM site 2000 to interface with the EWM system 1000. The EWM agent 4200 is responsible for the transfer of a batch of work-item-summary information from each EIM 2000 to the enterprise inventory manager 1400 of the EWM system 1000 for storing in the enterprise inventory repository of the latter (not shown in FIG. 2). The EWM agent 4200 is also responsible for sending a distribution request to the enterprise inventory manager 1400 to solicit distribution instructions. Then, the EWM agent 4200 passes the distribution instructions to a transfer manager of the EIM 2000 to perform actual work-item transfers to a designated work site 400 and its SWM 4000.

With regard to the interfacing between the EWM system 1000 and the ICM 3200 of the ECM 3000, as shown in FIG. 2, this interface is achieved via the CTI managers 4100 at the work sites 400. Furthermore, a site CTI manager 4100 can be incorporated into the ICM infrastructure to capture the SP Work status (i.e., sign-on and sign-off status, and work mode change from inbound, outbound or other workqueue managers) and to provide real-time updates to the resource manager 1100. As mentioned earlier in the resource manager functional description, the resource manager 1100 administers the enterprise SP resources and provide up-to-date SP information to the enterprise workload monitor 1500 and enterprise workload manager 1600. In order to support the functions of the enterprise workload monitor 1500, a connection is required between a site CTI manager 4100 and the corresponding PBX at such work site for collecting ICM and OCM real-time performance information. As for the infrastructure of the OCM 3400, outbound list managers 3450, as shown in FIG. 2, can be included to provide the enterprise workload monitor 1500 with outbound contact list performance data.

With regard to the interfacing between the EWM system 1000 and each SWM 4000 located at work site 400, there are three types of interfaces that are implemented: work-item update, notification, and prioritization, as shown in FIG. 2. Work-item update is the notification of status changes of work items captured by the SWM 4000. The possible statuses are: queued, active and completed. Notification is a message initiated by the enterprise workload manager 1600 to notify a SP for work mode changes or a site manager for SP staff reallocation. Prioritization is a message initiated by the enterprise workload manager 1600 to synchronize the re-prioritization between the EWM system 1000 and SWM workqueues.

The aforementioned EWM functional components and external interfaces are further decomposed into detailed next-level models below.

Resource Manager

Figure 3:
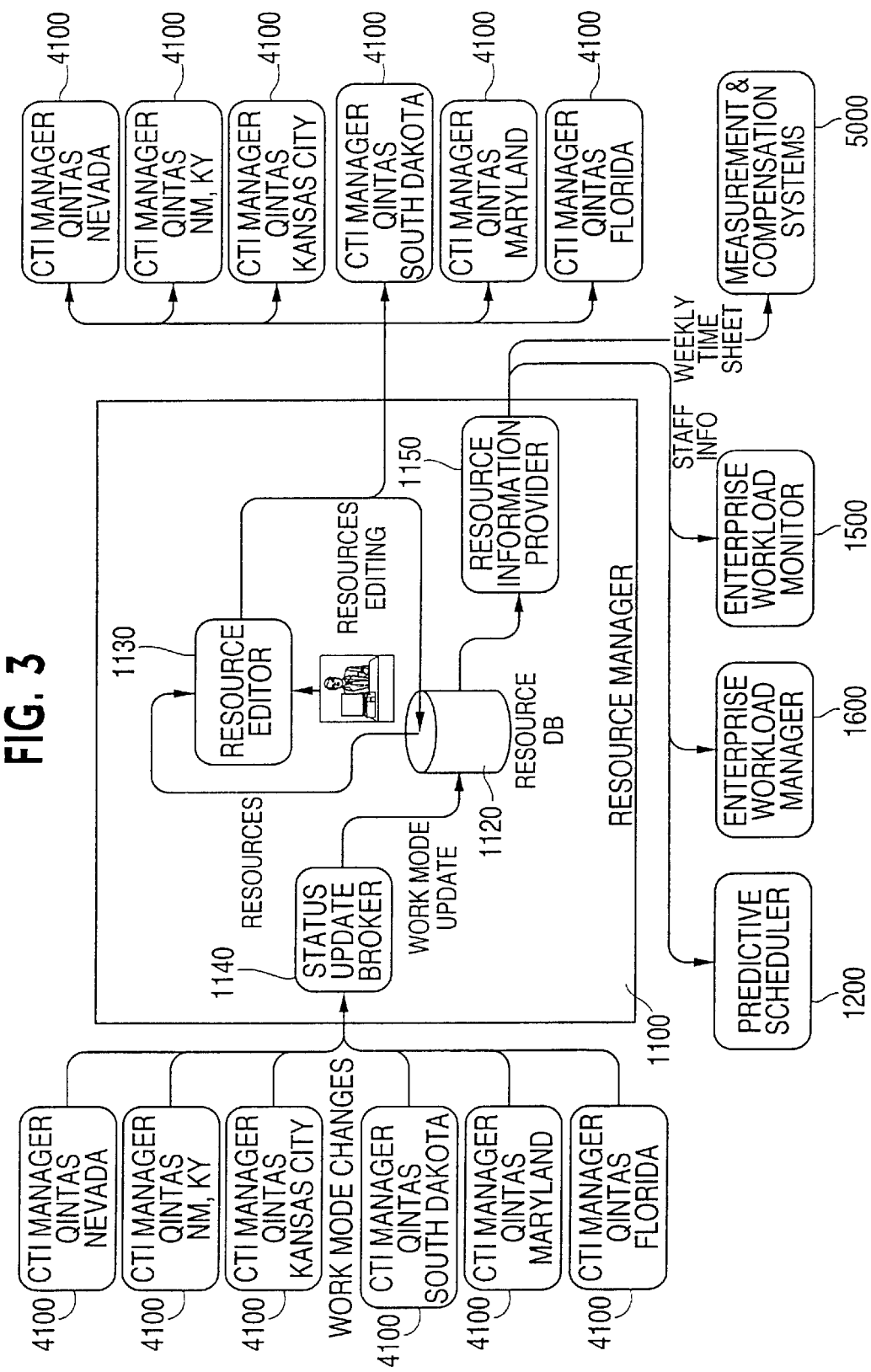
FIG. 3 depicts a functional model of the resource manager component of the EWM system in accordance to an embodiment of the present invention.

FIG. 3 depicts a functional model of the resource manager 1100, in accordance to an embodiment of the present invention. The resource manager 1100 contains a resource database 1120 and three functional components: resource editor 1130, status update broker 1140, and resource information provider 1150. The resource database 1120 is the enterprise resources repository of SP's. The resource editor 1130 is responsible for administering the resource database 1120 and propagating up-to-date information to various CTI managers 4100 at the work sites 400. The status update broker 1140 is responsible for receiving up-to-date SP work mode changes from the site CTI managers 4100 and updating the resource database 1120. The resource information provider 1150 is responsible for providing database retrieval services to the predictive scheduler 1200, the enterprise workload manager 1600, the enterprise workload monitor 1500, and the measurement & compensation systems 5000. The measurement & compensation systems 5000 are used to evaluate the performance of SP's and compensate them accordingly based on desired parameters set up by the financial institution.

The resource manager 1100 receives two types of input data elements: real-time SP work-mode updated by site CTI managers 4100 of work sites 400 and SP resources information entered by the ECC system user or administrator. The resource manager 1100 receives the real-time SP work-mode update, via its status update broker 1140, in accordance to the following parameters.

The frequency of an incoming work-mode message to the EWM system 1000 is determined by the average of handle-time and between-handle-time, wherein the inverse of such time period is multiplied by the number of signed on SP's. This setting can use inbound call performance as the standard for the frequency estimation. Assuming, for example, that the average of inbound call handle time is about 155 seconds, and the average speed of answer (ASA), i.e., the between-handle-time, is about 15 seconds; thus, to support a maximum of 7,000 signed-on SP's, the resource manager 1100 would be engineered to handle an average of 21 work-mode updates per second (or 7,000/(155+15)/2). Assuming a work-mode message is, for example, about 100 bytes including communication overhead, it is calculated that the resource manager 1100 would be engineered to process work-mode messages at an average of 2,100 (or 21*100) bytes per second. In case of a system restart or site switchover, the resource manager 1100 is able to obtain the up-to-date work modes within the next sub-hourly period. The resource manager 1100 is also responsible for maintaining the consistency of work-mode definitions among the EWM system 1000 and the service channels. For scaleability, it is also able to accept new types of work-modes for supporting future servicing needs. If an invalid work-mode is found, an alarm is generated to alert the ECC system user or administrator along with recommended actions.

The resource manager 1100 receives the second type of input data elements, the SP resources information populated by the ECC system user or administrator in accordance to the following parameters: The ECC system user or administrator enters the resource information via an editor screen or a script that contains a batch of SP resource information. Once the resource information is created, the system user or administrator verifies and updates the resource information via an editor screen. Assuming the SP information is, for example, about 4,000 bytes per record including database overhead; thus, to support a total of 20,000 SP's, it is estimated that the resource database 1120 must be engineered with a minimum of 80 Megabytes of disk space. For the availability of the EWM system 1000, the resource editor 1130, status update broker 1140, resource information provider 1150 and resource database 1120 are highly reliable and available to support the ECC operational functions. The resource information and service are recoverable and available within a sub-hourly period in case of failure. Furthermore, for the integrity of the EWM system design, the resource manager 1100 ensures that the resource information is consistent among the resource manager 1100, the predictive scheduler 1200, and the CTI managers 4100 of the SWM's 4000. Again, if a communication failure or inconsistent information is found, an alarm is generated to alert system user or administrators along with recommended actions.

Hence, there are three processing functions desired in supporting the centralized resources control functions of the resource manager 1100: real-time SP status updated from site CTI managers 4100, centralized on-line resource administration, and up-to-date resource database maintenance and resource information retrieval function. To perform these processing functions, the status update broker 1140 is engineered to interface a predetermined maximum number of CTI managers 4100, and to update the resource database 1120 after receiving a status update from one of the site CTI managers 4100. If there is a communication failure to a CTI manager, data collectors (to be defined later) of the enterprise workload monitor 1500 are responsible for providing notification within the enterprise workload monitor 1500 and recording the failed time period to the resource database 1120 to avoid incorrect reference by other EWM functional components. The resource editor 1130 is responsible for propagating any changes to the resource database 1120 and to a backup database at the backup EWM system site automatically, and providing a GUI interface allowing the ECC system user or administrator to manually initiate database propagation. The resource editor 1130 is also responsible for providing resource administration procedures. The procedures include: database backup, restore, and store and forward configuration; and resource information insertion, modification, and deletion. The resource editor 1130 is further responsible for providing resource integrity procedures to ensure database consistency among the resource manager 1100, the predictive scheduler 1200, and the CTI managers 4100. The resource database 1120 is to maintain up-to-date resource information at real-time to support the ECC with a 24 hours a day and 7 days a week operation. The resource information provider 1150 is responsible for providing database retrieval service functions with a standard application program interface (API) to the predictive scheduler 1200, the enterprise workload manager 1600, and the enterprise workload monitor 1500 with up-to-date resource information.

As shown in FIG. 3, the resource manager 100 produces three types of output data elements: updates to CTI manager and resource database, staff information referenced by other EWM components, real time adherence reports and weekly time sheets to measurement & compensation Systems. To provide adequate and accurate updates to CTI managers 4100 and the resource database 1120, the latter is engineered to handle an average number of work-mode updates per second as based on the number of signed-on SP's. For example, as exemplified earlier, with 7000 signed-on SP's the resource database 1120 is capable of handling an average of 21 work-mode updates per second. As also indicated earlier, to support the high availability and integrity of the system, any changes to the resource database 1120 are propagated between primary and backup sites. With regard to the output of staff information referenced by other EWM components, it is the resource editor's responsibility to ensure a new SP entity entered in the resource database 1120 will be propagated into an appropriate CTI manager 4100 and the predictive scheduler 1200; however, it is the CTI manager and the predictive scheduler responsibility to ensure there are no duplicated SP entities in their databases. Next, in order to support the real-time monitoring functionality of the enterprise workload manager 1600, the resource retrieval provide push technology to respond to updates requested by the enterprise workload manager 1600. The push technology also provides a mechanism to respond with up-to-date information to enterprise workload manager 1600 on a specified time period basis. The resource retrieval is also responsible for retrieving SP information to support the workload distribution functions provided by the enterprise workload manager 1600. The information may include SP name, internet protocol (IP) address, skill set, current work mode, and associated Unit manager's name and IP address.

Enterprise Workload Monitor

Figure 4:
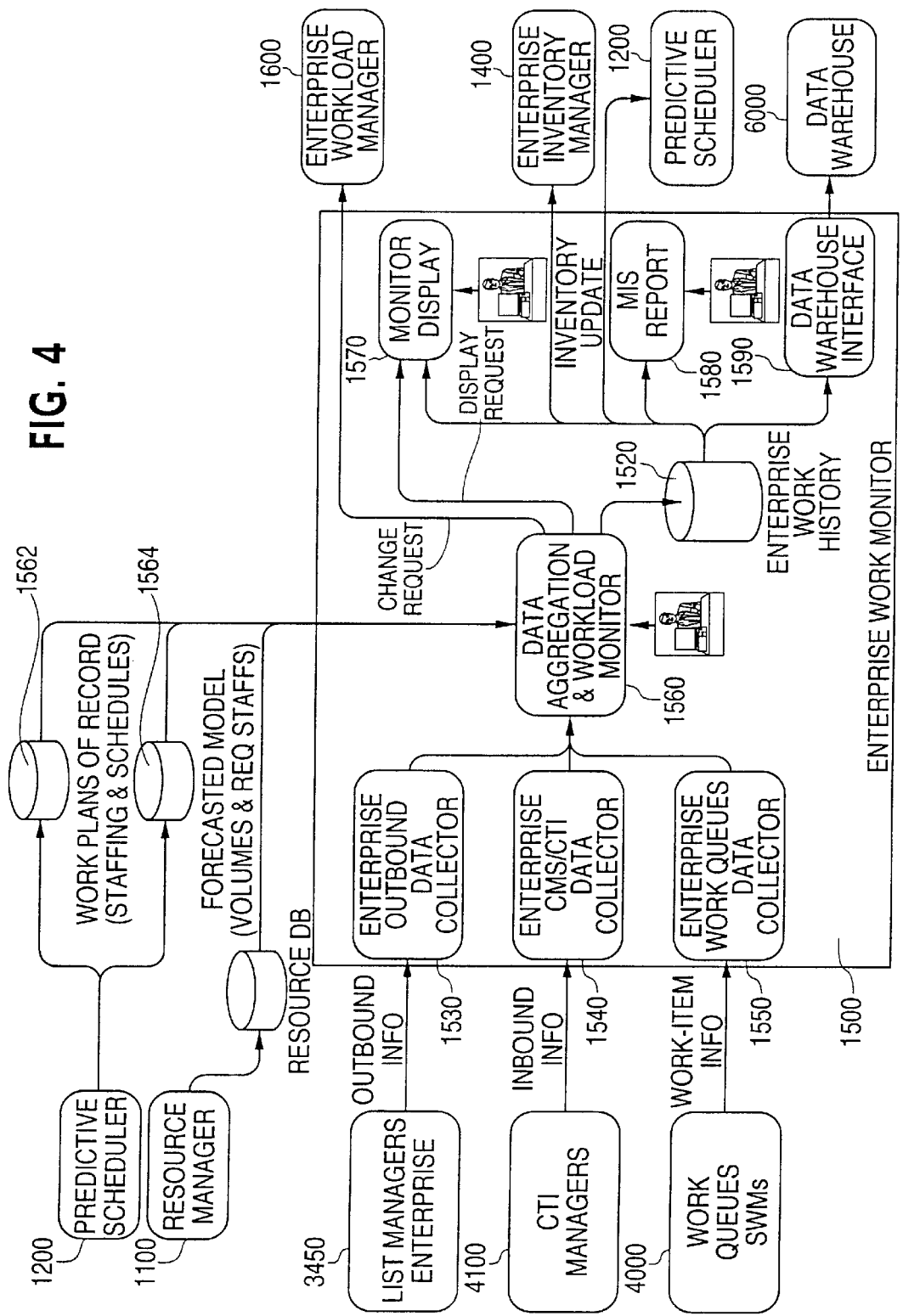
FIG. 4 depicts a functional model of the enterprise workload monitor component of the EWM system in accordance to an embodiment of the present invention.

FIG. 4 depicts a functional model of the enterprise workload monitor 1500, in accordance to an embodiment of the present invention. The monitor 1500 contains an enterprise workload history database 1520 and three data collection components: the enterprise outbound data collector 1530, the enterprise CMS/CTI data collector 1540, and the enterprise workqueues data collector 1550. The enterprise work monitor 1500 further contains a data aggregation & workload monitor 1560, a monitor display facility 1570, a MIS reporting facility 1580, and a data warehouse interface 1590. The enterprise work history database 1520 is the historical performance repository used to support the aforementioned EWM management and planning processes. As shown in FIG. 4, the three data collectors 1530, 1540, and 1550 collect real-time performance data from the inbound call management, outbound call management, and enterprise work-item management service channels. The monitor display 1570 is a set of display screens used by the ECC system user or administrator to monitor the enterprise performance in real-time. The MIS report 1580 is a set of GUI screens providing a variety of choices for ECC users to generate historical workforce management reports to support the performance improvement processes. The data warehouse interface 1590 is a set of functional components that are used to interface the enterprise workload monitor 1500 with the data warehouse systems 6000 of the financial institution.

The enterprise workload monitor 1500 receive three types of real-time input performance data elements: inbound, outbound, and work-item information. The inbound information contains four categories of messages, relating to an inbound call, sent by each CTI manager 4100 located at each work site 400: traffic, staffing, ASA, and handle time. The traffic category consists of one message, call-offers, that is the total number of inbound call volume accumulated in the current sub-hour, e.g., half-hour, execution period collected by each CTI manager 4100. The staffing category consists of two messages, staff-logged-on and staff-available. The staff-logged-on is the number of SP's who are currently signed on for handling inbound calls. The staff-available is the number of SP's available for answering inbound calls. The ASA category consists of three messages: ASA, calls-in-queue and oldest-call-waiting. The ASA is the average speed of answer measured by each CTI manager 4100. The calls-in-queue is the number of inbound calls waiting for answer in each private branch exchange (PBX) queue. The oldest-call-waiting is the oldest age of an inbound call waiting in a PBX queue. The handle time category consists of one message handle-time that is the average of an inbound call handling time collected by each PBX.

The above inbound information adheres to the following parameters: The frequency of an incoming inbound message is the sum of the frequency of an inbound call, the frequency of a staff-logged-on and off, the frequency of an ASA changed, and the frequency of the handle time changed. Because the frequency of staff-logged-on is relatively small compared to the frequency of incoming calls, every inbound call will generate a new call-offers and staff-available message, and may generate separate handle-time and ASA messages after a call has completed. Therefore, the frequency of an incoming inbound message is about three times that of an inbound call. For example, with a total of 1,500 SP's to handle inbound calls at peak hours achieving an average handle time of 155 seconds and an average speed of answer below 15 seconds, the system is able to handle a total of 19,286 (or 1800*1500/(155−15)) inbound calls within a half-hour period. Hence, the enterprise workload monitor 1500 is engineered to handle a maximum of 32 (or 3*19,286/1,800) incoming inbound messages per seconds. Assuming a work-mode message is, for example, about 100 bytes including communication overhead, the enterprise workload monitor 1500 is engineered to handle inbound messages at an estimated average of 3,200 (32*100) bytes per second.

In case of system restart or site switchover, the enterprise workload monitor 1500 is able to obtain the up-to-date inbound messages within the next half-hour period. It is also responsible for maintaining the consistency of inbound messages among the EWM system 1000 and the CTI managers 4100. It is also scaleable to support multiple PBX's across the enterprise. If a communication failure or an invalid inbound message is found, an alarm is generated to alert the ECC system user or administrator along with recommended actions.

The outbound information contains three categories of messages sent by the contact list managers 3450 located at each OCM center 3400: dialing, staffing, and handle time. The dialing category consists of three messages: list-to-call, calls-offered, and list-penetration-rate. The list-to-call is the number of calls to be dialed in the current half-hour execution period. The calls-offered is the total number of successfully connected outbound call volume accumulated in the last half-hour execution period. The list-penetration-rate is the number of calls expected to be connected in the next half-hour. The staffing category consists of two messages: staff-logged-on and staff-available. The staff-logged-on is the number of SP's who currently have signed on for handling outbound call. The staff-available is the number of SP's available for handling outbound calls. The handle time category consists of one message handle-time that is the average of an outbound call handling time recorded by each list manager 3450.

The above outbound information adheres to the following parameters: Because the frequency of staff-logged-on is relatively small compared to the frequency of handling outbound calls, every outbound call placement will generate a new list-to-call and call-penetration-rate messages at the same time. Every successful outbound call placement will generate a new call-offers, call-in-queue, and staff-available message at the same time, and generate a separate handle-time message after a call completion. Therefore, the frequency of an outbound message is the sum of the frequency of a list of calls to be dialed in a half-hour period, the frequency of successful connection results, and the frequency of the average handle time changed. For example, assuming the EWM system 1000 is engineered with a total of 5,000 SP's to handle outbound calls at peak hours and able to achieve an average handle time within 155 seconds, the system should be able to handle a total of 58,064 (or 5,000*1,800/155) successful outbound calls within a half-hour period. Assuming the call connection success ratio is, for example, 67%, the system is then able to place a total of 39,000 outbound calls within a half-hour period. Hence, the enterprise workload monitor 1500 must be engineered to handle a maximum of 33 (or 39,000/1,800+2*12,000/1,800) incoming outbound messages per seconds. Assuming a message is, for example, about 100 bytes including communication overhead, the enterprise workload monitor 1500 is then engineered to handle outbound messages at an estimated average of 3,300 (or 33*100) bytes per second.

In case of system restart or site switchover, the enterprise workload monitor 1500 is able to obtain the up-to-date messages within the next half-hour period. The enterprise workload monitor 1500 is also responsible for maintaining the consistency of outbound messages among the EWM system 1000 and list managers 3450. The enterprise workload monitor 1500 also scales to support multiple list managers within the enterprise. If a communication failure or an invalid message is found, an alarm is generated to alert the ECC system user or administrator along with recommended to actions.

A third type of input data received by the enterprise workload monitor 1500 is the work-item information, which contains three categories of messages sent by each work-queue manager of the SWM 4000 located at each work site 400: items offered, staffing, and handle time. The items-offered category consists of three messages: email-offered, fax-offered, and mail-offered. The email-offered is the total number of e-mail items completed in the current half-hour execution period. The fax-offered is the total number of fax items completed in the current half-hour execution period. The mail-offered is the total number of mail items completed in the current half-hour execution period. The staffing category consists of two messages for each e-mail, fax or mail work category: staff-logged-on and staff-available. The staff-logged-on is the number of SP's currently signed on for handling e-mail, fax or mail category. The staff-available is a number of SP's available for handling e-mail, fax or mail items. The handle time category consists of one message handle-time for the average handling time in each work category.

The above work-item information adheres to the following parameters: For example, it is estimated a maximum of 2,000 SP's will be assigned to handle e-mail, fax, and mail work items at a peak time; thus, to achieve an average of 155 seconds handle time, the EWM system 1000 is then able to handle a total of 23,225 (or 2,000*1,800/155) work items within a half-hour period. Because the frequency of staff-logged-on is relatively small compared to the frequency of handling work items, the enterprise workload monitor 1500 is engineered to handle a maximum of 12 (or 2,000/155) incoming work-item messages per seconds. Assuming, for example, a message is about 100 bytes including communication overhead, the enterprise workload monitor is then engineered to handle work-items messages at an estimated average of 1,200 (or 12*100) bytes per second.

In case of system restart or site switchover, the enterprise workload monitor 1500 is able to obtain the up-to-date messages within the next half-hour period. The enterprise workload monitor 1500 is responsible for maintaining the consistency of work-item messages among the EWM system 1000 and SWM's 4000. It is also scaleable to support multiple work-queue managers across SWM's. If a communication failure or an invalid message is found, an alarm is generated to alert the ECC system user or administrator along with recommended actions.

As shown in FIG. 4, the enterprise workload monitor 1500 includes three types of user interface: data aggregation & workload monitor 1560, monitor display 1570, and MIS reporting facility 1580. There are two sets of user interface to support the functions of the data aggregation & workload monitor 1560: data editor and monitor editor. Data editor consists of a set of screens: data definition, data composition, and database definition. Data definition is used to define the collected data characteristic of a specific service channel to provide a maintenance-free data collection mechanism to support time to market. Data composition is used to compose the collected data and customized messages for on-line display and data storage purposes. Database definition is used to define database storage templates that describes how data is stored and how to retrieve data. Monitor editor is a set of screens used to define the monitoring parameters for the real-time and on-line monitors' functions. These parameters may include what data is to be collected, definition of threshold control levels, what the threshold is for each control level, and what action should be taken and messages should be sent when a monitoring event meets a certain threshold.

With regard to the monitor display 1570, it is a set of monitor screens that provide graphical user interface for the ECC system user or administrator to perform on-line monitoring activities. Here, the aforementioned monitor editor is used to define the display format of the monitor display. With regard to the MIS reporting facility 1580, it is a facility that provides a set of screens for the ECC system user or administrator to generate a variety of reports to support the sub-hourly to long-range workforce management for performance improvement process.

There are three processing functions desired in supporting the enterprise workload monitor 1500: real-time data collection from all service channels, real-time and on-line performance monitor and event notification, and historical performance data maintenance and future planning support. The processing parameters are as follows.

As shown in FIG. 4, three data collectors 1530, 1540, and 1550 are utilized; each collector is responsible for collecting performance data from its corresponding service channel. These performance data are standardized before forwarding to the data aggregation & workload monitor 1560. These data collectors are engineered to support the growth of service channels and SWM's with no impact to ECC normal operations. For any communication failure resulting in lost data, the data collectors are responsible for notifying the data aggregation & workload monitor 1560, and propagating the failed time period to data aggregation & workload history 1560 to avoid invalid corrective actions, and incorrect reference for future planning.

The data aggregation & workload monitor 1560 is designed to compose the collected data with customized information defined by data editor to support real-time and on-line display monitoring functions. The customized data are as follows: user defined messages, work plans of record 1562 and forecasted models 1564 supported by the predictive scheduler 1200, and SP resource information supported by the resource manager 1100. The data aggregation & workload monitor 1560 also provides a real-time workload monitor engine (not shown) with threshold control mechanism to monitor the parameters defined by the monitor editor. The monitor engine also supports display request information to on-line monitor display to support ECC on-line operations. The monitor engine is engineered to support a predetermined maximum number of monitor display workstations. The real-time monitor engine also notifies the enterprise workload manager 1600 by sending a change request message when it detects a condition that meets criteria specified by the monitor editor.

The on-line monitor display implement a set of screens enabling ECC system user or administrators to display the underlying real-time monitoring activities. The on-line display also provides screen navigation functions allowing the ECC system user to switch monitor activities from enterprise to site, business segment, skill group, and to a specific SP. The data aggregation & workload monitor 1560 stores the collected data into the historical database 1520 summarized by quarter-hour to support accurate volume forecast for the future.

To support the workforce management objectives, the historical database, or enterprise work history database, 1520 is engineered to store the collected data and associated information with quick accessibility to quarter-hourly, half-hourly, session, daily, weekly, monthly, short-range, and long-range historical data. Ongoing data maintenance processing is provided to ensure the integrity and availability of the enterprise work history to support the predictive scheduler 1200 for future planning, and MIS reporting for the improvement process.

The enterprise workload monitor 1500 provides two types of output data elements: change request to the enterprise workload manager 1600 and historical data to the predictive scheduler 1200, the MIS reporting facility 1580, and the data warehouse 6000. The parameters for sending change request to enterprise workload manager are as follows: (1) the real-time monitor engine is responsible for delivering the change request message and requesting confirmation from the enterprise workload manager 1600 for guaranteed delivery; (2) the change request message may contain a reason code for increasing or decreasing the number of SP's from a service channel, a reason context created by the monitor editor, and a list of channel performance data. The monitor editor provides a testing facility to ensure the real-time monitor engine will map reason codes to correct business logic supported by the enterprise workload manager 1600. The list of channel performance data may include inbound call real-time data, such as calls-offered, staff-logged-on, staff-available, ASA, calls-in-queue, oldest-call-waiting, and handle-time; inbound call next half-hour forecast data, such as forecast-volume, number-of-scheduled-staffs, and number-of-scheduled-off; outbound call real-time data, such as list-to-call, calls-offered, calls-in-queue, staff-logged-on, staff-available, and handle-time; outbound call next half-hour forecast data, such as forecast-volume, number-of-scheduled-staffs, and number-of-scheduled-off; e-mail work-item real-time data, such as email-offered, email-staff-logged-on, email-staff-available, and email-handle-time; e-mail next half-hour forecast data, such as forecast-volume, number-of-scheduled-staffs, and number-of-scheduled-off; fax work-item real-time data, such as fax-offered, fax-staff-logged-on, fax-staff-available, and fax-handle-time; fax next half-hour forecast data, such as forecast-volume, number-of-scheduled-staffs, and number-of-scheduled-off; mail work-item real-time data, such as mail-offered, mail-staff-logged-on, mail-staff-available, and mail-handle-time; and mail next half-hour forecast data, such as forecast-volume, number-of-scheduled-staffs, and number-of-scheduled-off.

The real-time monitor engine also references a parameter defined by the monitor editor for the frequency of sending the same type of change request within a half-hour period. The default frequency are as follows: a SP cannot be switched from one service job to another service job more than once within a half-hour period; and a SP cannot be switched from one service job to another service job more than 4 times a day.

The parameters for supporting historical data to the predictive scheduler 1200 and the MIS reporting facility 1580 include the followings: The enterprise work history database 1520 is responsible for providing standard database interfaces for retrieving a variety of historical data by the predictive scheduler 1200 and the MIS report 1580; the predictive scheduler 1200 and MIS reporting 1580 may request the historical data on every workforce planning phase: long-range, short-range, weekly, daily, session and half-hourly; and the historical data model is engineered to avoid system performance degradation during the data retrieving period.

Enterprise Inventory Manager

Figure 5:
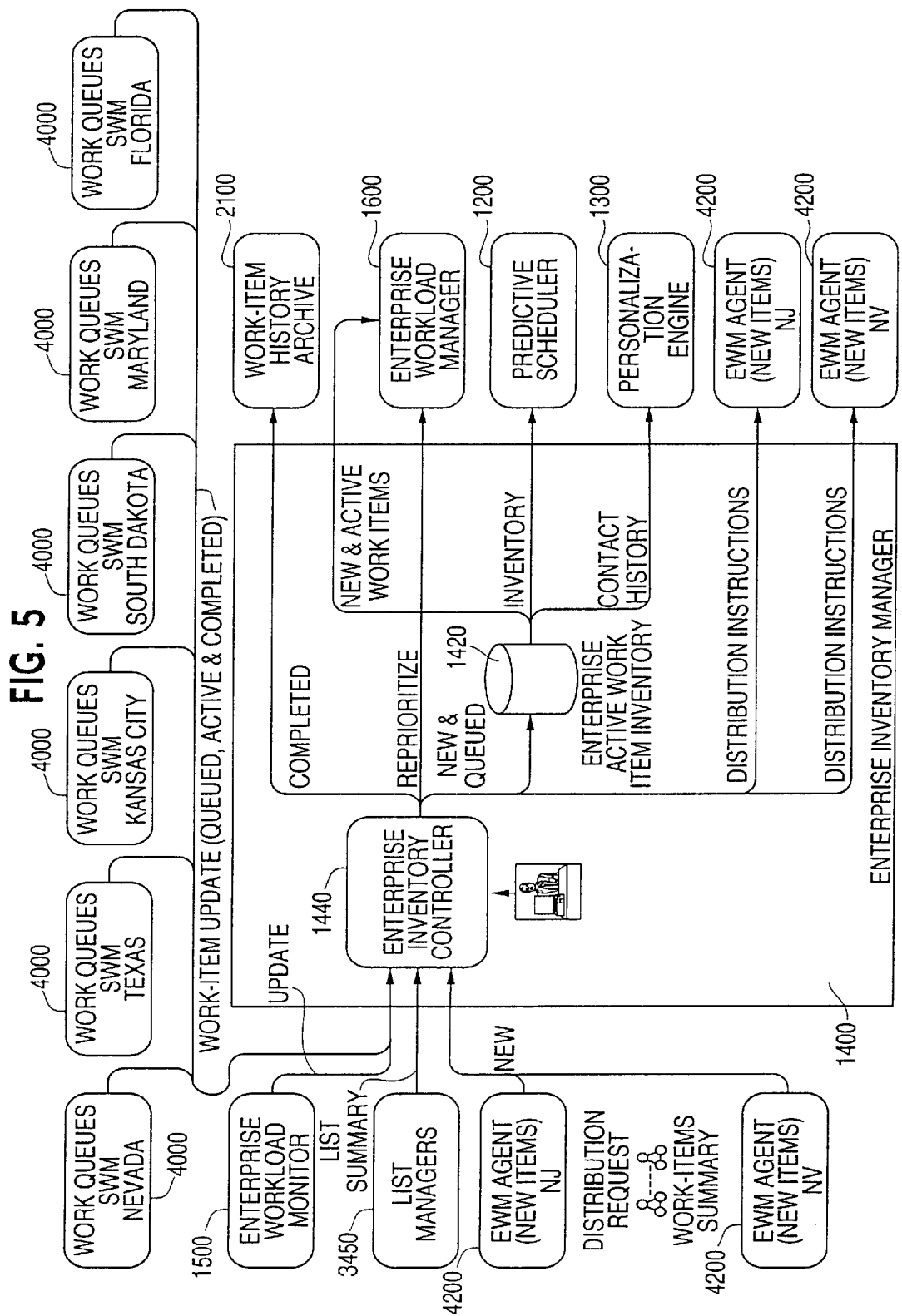
FIG. 5 depicts a functional model of the enterprise inventory manager component of the EWM system in accordance to an embodiment of the present invention.

FIG. 5 depicts a functional model for the enterprise inventory manager 1400, in accordance to an embodiment of the present invention. The enterprise inventory manager 1400 contains an enterprise active work item inventory 1420 and an enterprise inventory controller 1440. The inventory 1420 is a persistent database used by the inventory controller 1440 to track the work-item status. The enterprise inventory controller 1440 is designed to ensure the transaction integrity of the work items, from receiving new work-items to assignment to a work-queue and to the completion of work-item archiving.

The enterprise inventory manager 1400 receives four types of input data elements: new work-item summary sent by the EWM agents 4200 located at each EIM site 2000, distribution request sent by such EWM agents, work-item status updated by site work-queue managers of SWM's 4000 located at work sites 400, and reprioritization commands entered by the ECC system users or administrator.

With regard to the new work-item summary, the new mail work items are created at each enterprise mailroom mega sites 200 by its EIM site 2000, and packaged as a group up to a predetermined maximum number of work items, such as 100 work items. These work items are accumulated at each EIM site 2000 as they wait for distribution instructions. Then, each EWM agent 4200 is scheduled to construct new work-item summary messages to send to the enterprise inventory manager 1400 periodically (for example, 2 or 3 times each day) at off peak hours. Each message may contain a predetermined maximum number of work-item summaries; for example, 100 summaries. The summary information may contain customer ID, relationship information, work-type, and segment. Assuming, for example, that the summary information is about 200 bytes, then a new work-item summary batch may be up to a maximum of 20,000 bytes (100 summaries*200 bytes/summary). As estimated before in the workload monitor input discussion, the EWM system 1000 is engineered to handle a maximum of 23,225 work items within a half-hour period. Assuming the system is engineered to work on the maximum number of work-items for an 8-hour day, then the EWM system 1000 is engineered to handle a maximum of 371,600 (or 23,225*16) work items a day. Hence, the communication interfaces among the EWM system 1000 and the EWM agents 4200 are engineered to handle a maximum of 74,320,000 (or 371,600*200) bytes data per day. For the transaction integrity, each EWM agent 4200 is responsible for delivering the new work-item summary message and requesting confirmation from the enterprise inventory controller 1440 for guaranteed delivery. The inventory controller 1440 is responsible for maintaining the summary information and managing update of the contact history database 1320 of the contact history manager 1300. It is responsible for tracking the EWM agent requests to ensure that the EWM system 1000 responds with distribution instructions to the originating EWM agent 4200. If a communication failure is detected, an alarm is generated to alert the ECC system user or administrator along with recommended actions.

With regard to the distribution request type of input data, as exemplified before, the new work-item inventory summary information transmission occurs about 2 or 3 times a day, therefore, the message volume and size of the distribution request can be ignored. For the transaction integrity, each EWM agent 4200 is responsible for delivering the distribution request message and requesting confirmation from the enterprise inventory manager 1400. The EWM agents 4200 and the enterprise inventory manager 1400 are responsible for maintaining consistency. The distribution request message contains the originating agent ID to ensure the inventory manager 1400 will respond with correct distribution instructions to the originating EWM agent 4200. If a communication failure is detected, the enterprise inventory controller 1440 is also responsible for generating an alarm to alert the ECC system user or administrator along with recommended actions.

With regard to the work-item status type of input data, as indicated earlier, because the EWM system 1000 is engineered to handle a maximum of 23,225 work items in a half-hour period, it is engineered to handle a maximum of 12 incoming work-item status updates per second. Assuming, for example, that a work-item status update message is about 400 bytes including contact history and communication overhead, then the inventory controller 1440 is engineered to handle work-item status update at an average of 4,800 (or 12*400) bytes per second. For the transaction integrity, the work-queue manager at each SWM 4000 is responsible for delivering the work-item update message and requesting confirmation from the enterprise inventory controller 1440 for guaranteed delivery. The inventory controller 1440 and work-queue manager at each SWM 4000 located at the work site 200 are responsible for maintaining message consistency. If a communication failure or an invalid message is found, the inventory controller 1440 is responsible for generating an alarm to alert the ECC system user or administrator along with recommended actions.

With regard to the reprioritization commands type of input data received by the enterprise inventory manager 1400, the enterprise inventory controller 1440 is designed to support a set of display screens allowing users to change the priority assignment of the service channels, such as the default priority is as follows from high to low: e-mail, fax, and mail, and to enter a specific time to execute reprioritization of a work item, a group of work items, or all the work-items in inventory. Furthermore, the user interface is designed to allow users to specify the initiation of a reprioritization, such as an on-line request, off-line scheduled time, or each time a new work-item summary is delivered.

There are six processing functions supported in the enterprise inventory manager 1400: insert new inventory, request for planning, request for distribution instructions, update and reprioritize inventory, archive work-item, and update contact history. The processing parameters are as follows.

As mentioned before, the enterprise inventory controller 1400 receives new work-item summary transactions from the EWM agents 4200. Before the completion of each transaction, the enterprise inventory controller 1400 stores each new work-item summary into the active work-item inventory database 1420, and output the total volume of current inventory (new & queued) to the predictive scheduler 1200 to request a plan of record update: volume forecast, resources required, and work schedules. Later, the plan of record will be referenced by the enterprise workload manager 1600 to produce workload distribution instructions. It should be noted that the volume includes the reprioritization of queued work-items.

After the actual work item has been transferred into a workqueue by an EIM 2000, the work-queue manager at an SWM 4000 will send a work-item queued status message. Work-item summary information will remain in the inventory database 1420 until the enterprise inventory controller 1400 receives a completed status. A work-item may be in an active state if a work-item is in a processing work-step such as waiting for approval. Upon receipt of a completion message for a work-item, the enterprise inventory controller 1400 will forward the completion message to contact history database 1320 and the work-item history archive 2100 of the EIM 2000. The work-item will be archived and removed from the work-item inventory 1420. For the availability and integrity of the system, the enterprise inventory controller 1440 is responsible for supporting the database backup and recovery procedures, including delta, incremental and full backup procedures.

As shown in FIG. 5, the enterprise inventory manager 1400 provides five output data elements: completed work-item summary message to work-item history archive, reprioritization and new & active work items to the enterprise workload manager 1600, inventory to the predictive scheduler 1200, distribution instructions to EWM agents 4200, and contact history update for the contact history manager 1300. The output parameters are as follows.

As exemplified earlier, the EWM system 1000 is engineered to handle a maximum of 23,225 work items in a half-hour period; thus, the inventory controller 1440 is engineered to handle a maximum of 12 completed messages per second to the work-item history archive 1420, and also to forward a maximum of 12 contact histories per second to the contact history database 1320 of the contact history manager 1300. If it is assumed, for example, that a completed message is about 200 bytes, and a contact history message is about 400 bytes, then the inventory controller 1440 is engineered to handle a maximum of 7,200 (Or 12*600) bytes per second. As mentioned before, the new work-item inventory reprioritization transaction is triggered about 2 or 3 times a day; therefore, the size of the inventory message to the predictive scheduler 1200 is negligible. As indicated before, the EWM system 1000 is engineered to handle a maximum of 371,600 work items a day. Assuming, for example, that the EWM system 1000 is designed to support 2 new inventory reprioritizations per day, the system is thus designed to handle a maximum of 185,800 work items per transaction, or 37,160,000 (or 185,800*200 bytes of work-item) bytes of transaction data per day.

Predictive Scheduler

Figure 6:
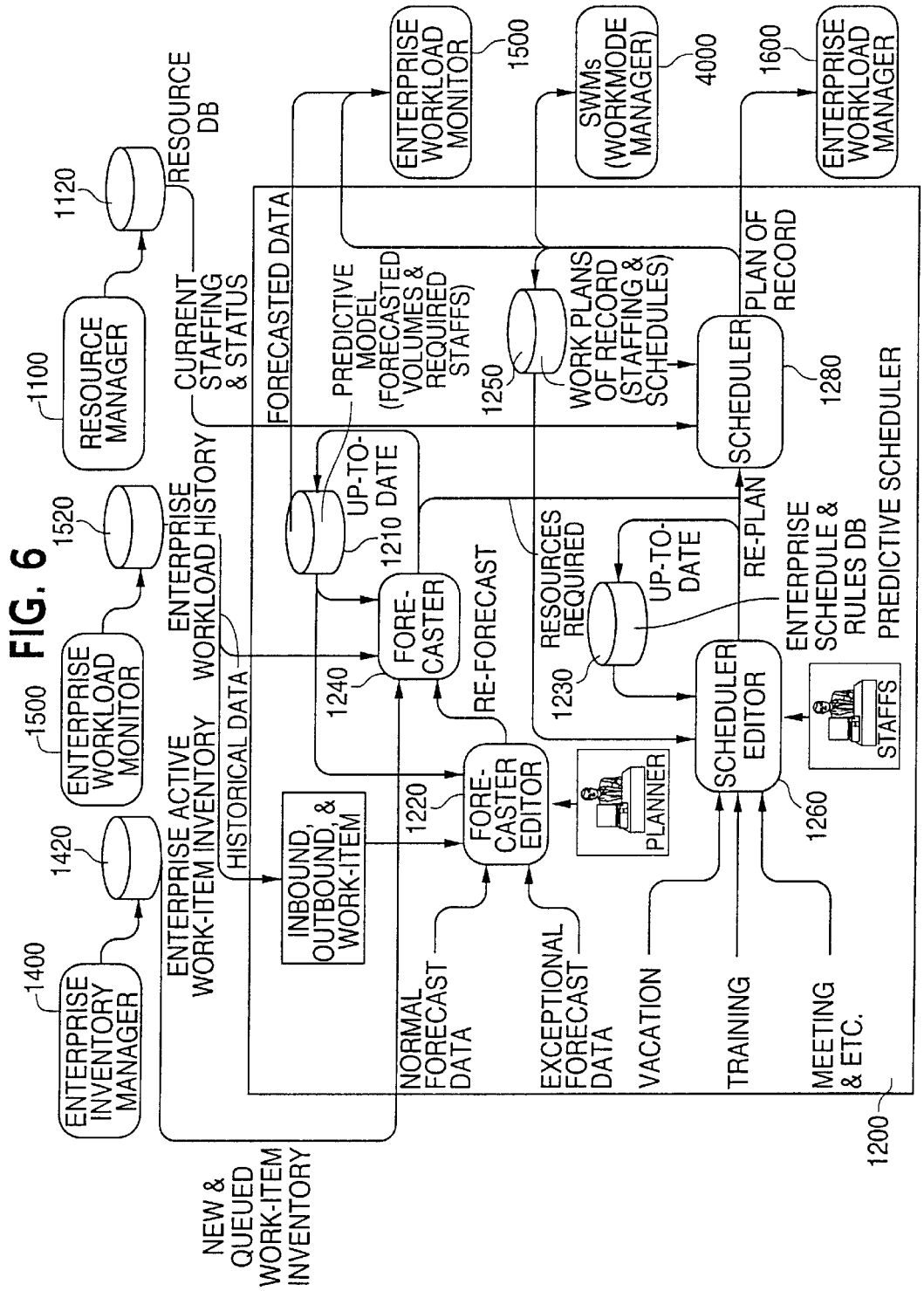
FIG. 6 depicts a functional model of the predictive scheduler component of the EWM system in accordance to an embodiment of the present invention.

FIG. 6 depicts a functional model of the predictive scheduler 1200, in accordance to an embodiment of the present invention. As shown, the predictive scheduler 1200 contains three data repositories and four functional components. The three repositories are the predictive model database 1210, the enterprise schedule & rules database 1230, and the work plans of record database 1250. The predictive model database 1210 is a forecasting repository that contains a variety of forecasted volumes and required staffing models for all the supported service channels. It includes the following workforce plannings: long-range, short-range, weekly, daily, session, and half-hourly. The enterprise schedule & rules database 1230 is a scheduling rules repository that contains an enterprise calendar and a variety of scheduling rules. The work plans of record database 1250 is a staffing and scheduling repository that contains detailed service professional schedules including long-range, short-range, weekly, daily, session, and half-hourly scheduling.

The four functional components are the forecaster editor 1220, the forecaster 1240, the scheduler editor 1260, and the scheduler 1280. The forecaster editor 1220 is a set of volume forecasting screens that enable the ECC system planner to enter, edit and test forecasting data. The planner could predict future arrival rates based on historical data, and user-specified normal and exceptional parameters. The forecaster 1240 is the underlying forecasting mechanism that uses applied research algorithms to estimate staff required for forecasted volumes and user-specified parameters. It is the method used to fulfill the low cost and high volume objectives. The scheduler editor 1260 is a set of screens used to specify detailed staff schedules based on enterprise calendar and scheduling rules defined in the schedule & rules database 1230. For example, the operating hours for each day of the week, the amount of work time allowed between breaks, and the patterns of days on and off that are allowed, etc. The scheduler 1280 is the underlying scheduling mechanism used to create and evaluate a set of work plans based on forecasted staffing requirements and enterprise staffing schedules. The scheduler ensures the accuracy of the work schedules by having the right number of SP's available at the right time.

As shown in FIG. 6, the predictive scheduler 1200 receives three types of input data elements: normal and exceptional forecast data entered by the ECC planner, scheduling rules and planning schedules entered by staff, and work-item inventory 1420 managed by the enterprise inventory manager 1400. The input data requirements are as follows.

At each volume-planning phase for a service channel, the ECC planner uses the forecaster editor 1220 to validate normal and exceptional forecast volume. The frequency and the volumes of the input data are insignificant and therefore ignored. At the enterprise schedule-planning phase, the ECC planner uses the scheduler editor 1260 to enter the enterprise working calendar and scheduling rules. The frequency and the volumes of the input data are insignificant and are therefore ignored. Staff can also use the scheduler editor 1260 to enter planning schedules and actual scheduled adjustment. The frequency and the volumes of the input data are insignificant and are therefore ignored. As mentioned before, the new inventory and reprioritization transaction occur 2 or 3 times a day; therefore, the work-item inventory message to the forecaster volumes are ignored. Thus, the forecaster editor 1220 and the scheduler editor 1260 are designed to achieve the business objectives described earlier. Furthermore, the screen layout and format parameters of the forecaster editor 1220 and the scheduler editor 1260 can be set, as is known to one of ordinary skill in the art, based on the wants and needs of the financial institution.

There are two processing functions supported in the predictive scheduler 1200: forecaster editor and forecaster functions, and scheduler editor and scheduler functions. The processing parameters are as follows.

The functions of the forecaster editor 1220 and forecaster 1240 are designed to support the long-range and short-range workforce management plannings: volumes are estimated by segment, all overhead assumptions are agreed to by the business, marketing initiatives are incorporated, and volumes are converted to the number of SP's required. Those functions are also designed to support all service channels: inbound, outbound phone calls, and individual work-items. The functions of the forecasting editor 1200 and forecaster 1240 also incorporate the business budget approval procedure in the planning process. To comply with the improvement process, historical data are referenced by such functions with optimized results analysis, improvement feedback, and business management assumptions.

The functions of the scheduler editor 1260 and scheduler 1280 are designed to support the long-range, short-range, weekly, daily, session, and sub-hourly workforce management plannings, such as site allocation plan, site build-out plan, vacation plan, systems enhancement/roll-out plan, hiring plan, training plan, development plan, team meeting, other non-call handling activities, call routing and workload distribution plan, overtime requirements, financial approval, and absence coverage plans. Such functions are also designed to incorporate the current staffing volumes from resource database to support the real-time workload planning activities. Both the forecasting editor 1220 and the scheduler editor 1260 are controllable by the ECC administrator.

FIG. 6 also shows that the predictive scheduler 1200 produce two types of output data elements: work plans of record and forecasted data as the control required for the enterprise workload monitor 1500, and plan of record as the control is required for the enterprise workload manager 1600. The output parameters are as follows.

As described earlier in the discussion of the enterprise workload monitor 1500, the work plans of record 1562 and forecasted data 1564, as shown in FIG. 4, are required for the enterprise workload monitor 1500 to produce correct outputs, such as change request messages to the enterprise workload manager 1600, the monitor display 1570 and the MIS report 1580 requested by the ECC administrators. The frequency and volume of the output data are insignificant, therefore, could be ignored. However, the work plans of record and forecasted data are available all the time to support the real-time monitoring capability.

As described in the parameters for the enterprise inventory manager 1400, the plan of record consists of volume forecast, resources required, and staff work schedules that are referenced by enterprise workload manager 1500 to produce correct workload distribution instructions. As exemplified before, the frequency of volume and schedule forecasting is insignificant, and the new inventory transaction occurs 2 or 3 times a day; therefore, the frequency and volume of plan of record changes initiated by the enterprise inventory manager 1400 to the enterprise workload manager 1600 can be ignored.

Enterprise Workload Manager

Figure 7:
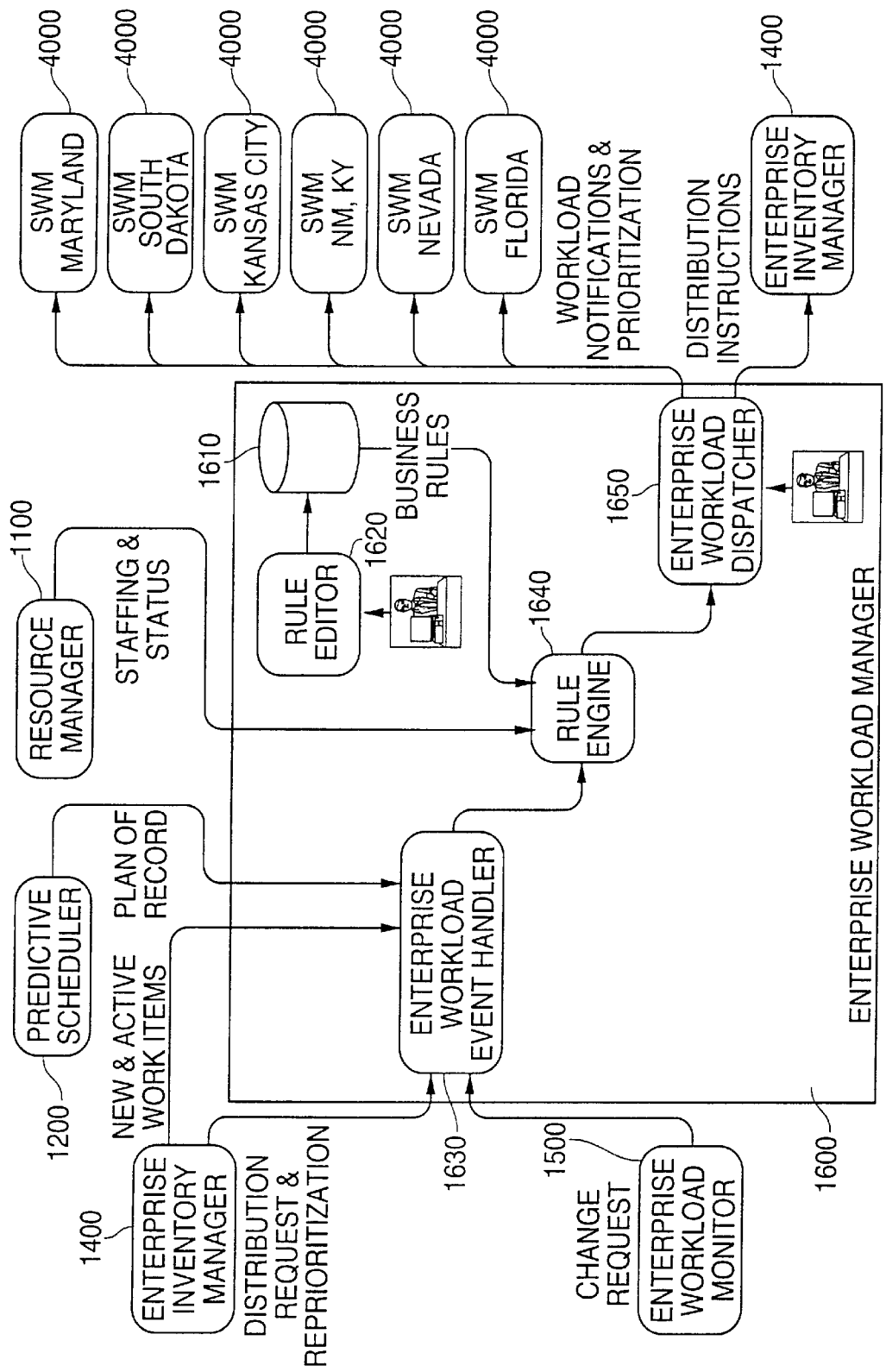
FIG. 7 depicts an enterprise workload manager component of the EWM system in accordance to an embodiment of the present invention.

FIG. 7 depicts a functional model of the enterprise workload manager 1600, in accordance to an embodiment of the present invention. The enterprise workload manager 1600 contains a business rules repository 1610, a rule editor 1620, an enterprise workload event handler 1630, a rule engine 1640, and an enterprise workload dispatcher 1650. The business rules repository 1610 contains a variety of business logic that can be built and customized by the ECC administrator. The rule editor 1620 is a business logic development facility that contains a variety of GUI screens for building of business rules and testing what-if scenarios. The enterprise workload event handler 1630 is designed to interface with other functional components of the EWM system 1000 and to convert the received message to standard format and forward to the rule engine 1640 for execution. The rule engine 1640 is designed to execute the business logic built by the rules editor at runtime. At runtime, when the rule engine 1640 detects an event sent by the event handler 1630, it will retrieve the corresponding business logic from the business rules repository 1610 and execute the business logic. The enterprise workload dispatcher 1650 is designed to dispatch the end results of the business logic. The end results may include user intervention for management approval, distribution instructions to the EWM agents 4200, and workload notifications & reprioritization messages to the SWM's 4000.

As shown in FIG. 7, the enterprise workload manager 1630 receives four types of input data elements: the distribution request sent by the enterprise inventory manager 1400, the change request sent by the enterprise workload monitor 1500, the reprioritization sent by the enterprise inventory manager 1400, and the GUI interfaces provided by the rule editor 1620 and the workload dispatcher 1650. The parameters for the distribution request input data are as follows.

As exemplified in the parameters for the enterprise inventory manager 1400, the new work-item inventory transaction occurs merely about 2 or 3 times a day; therefore, the message size of the distribution request can be ignored. As further exemplified in such parameters, the EWM system 1000 are engineered to handle a maximum of 371,600 work items a day. Assuming there are 2 new inventory transactions per day and the event handler 1630 must retrieve the new & active work items from the inventory repository within a quarter-hour (i.e., 15*60 seconds), then the event handler 1630 are engineered to handle a minimum of 206 (i.e., 371,600/(2*15*60)) work items per second. For transaction integrity, each EWM agent 4200 is responsible for delivering the distribution request message and requesting confirmation from the enterprise inventory manager 1400. Therefore, the enterprise workload manager 1600 is responsible for responding the distribution instructions to the enterprise inventory manager 1400 for guaranteed delivery. The EWM agents 4200, the enterprise inventory manager 1400 and the enterprise workload manager 1400 are responsible for maintaining a consistency of the distribution request messages. The distribution request message must contain the originating agent ID to ensure that the inventory manager 1400 and workload manager 1600 will respond with correct distribution instructions to the originating EWM agent 4200. If a communication failure is detected, the event handler 1630 is also responsible for generating an alarm to alert the ECC system user or administrator along with recommended actions.

The parameters for the second type of input data, the change request input data, are as follows. As described in the output parameters for the enterprise workload monitor 1500, the real-time monitor engine is responsible for delivering the change request message and requesting confirmation from the enterprise workload manager 1600 for guaranteed delivery. As further described in such output parameters, the same type of change request will not be generated within a half-hour period; therefore, the volume of the change request can be ignored. Additionally, the monitor editor is responsible for providing a testing facility to ensure the real-time monitor engine will map change request reason codes to the correct business logic supported by the enterprise workload manager 1600. If a communication failure is detected, the event handler 1630 is responsible for generating a major alarm to alert the ECC system user or administrator along with recommended actions.

The parameters for the reprioritization input data are as follows. As described in the inventory manager requirements, the reprioritization process may be initiated by on-line user request, off-line scheduled time, or at each new work-item summary delivery time. It is estimated the frequency of the reprioritization process should occur a minimum of 2 or 3 times a day, and maximum of 48 times a day (not more than once per half-hour). For the transaction integrity, the inventory manager 1400 is responsible for delivering the reprioritization messages and requesting confirmation from the enterprise workload manager 1600 for guaranteed delivery. The event handler 1630 and the enterprise inventory manager 1400 are responsible for maintaining consistency of the reprioritization messages. If a communication failure is detected, the event handler 1400 is also responsible for generating an alarm to alert the ECC system user or administrator along with recommended actions.

There are three processing functions required to support the enterprise workload manager 1600: workload distribution, change request, and work-item reprioritization. The processing parameters for the workload distribution are as follows. Upon receiving a distribution request message from an EWM agent 4200 via the inventory manager 1400, the event handler 1630 will request the corresponding plan of record from the predictive scheduler 1200 and retrieve the associated new & active work items summary from the enterprise inventory controller 1440 based on the transaction ID of the distribution request message. The plan of record may consist of new work-item volume, new work-item resources required, available SP work schedules, active work-item volume, active work-item resources required, and a list of SP's and their current work plans. Then, the event handler 1630 will send the distribution request message along with the new & active work items summary and the plan of record to the rules engine 1640 to produce new workload distribution instructions. Upon receiving a distribution request message from the event handler 1630, the rules engine 1640 will invoke the associated business logic to process the request. The business logic is designed to produce the following workload distribution instructions: (1) process the active work-items before the new work-items; process the work-item based on their priority and type; (2) extract the total number of SP's who are currently assigned to handle the group of active work-item; (3) validate the resources required for a work-item group against the number of available SP's; (4) if more resources are required to process work-items, the exceptional business logic may be invoked to record the amount of additional resources required, and the exceptional business logic may be invoked to calculate the total amount of required resources at the end of the distribution request business logic; (5) if there are enough resources to handle a group of work-item, the logic may construct the list of distribution instructions assigning the work-items to the recommended group of SP's; (6) retrieve the current staffing & status information from resource manager, and construct a list of notification messages according to the availability of the SP's. A notification message may be sent to an available SP. If a SP is not signed on, the notification may be sent to a unit manager, an operations manager, or a site manager who is signed on and has a valid IP address, and (7) ensure the frequency of switching a SP from one service job to another service job is not more than 4 times within a day.

After the completion of the distribution request business logic, the rules engine 1640 then forwards the distribution instructions to the enterprise workload dispatcher 1650 to request management approval of the changes. The workload dispatcher 1650 is responsible for delivering the distribution instructions to the originating EWM agent 4200 at the EIM 2000, via the enterprise inventory manager 1400. The workload dispatcher 1650 is also responsible for the guaranteed delivery of the distribution instructions and notification messages.

The process parameters for the change request are as follows. As mentioned before, a change request message may contain a reason code, a reason context, and a list of channel performance data. Upon receiving a change request message from the enterprise workload manager 1600, the event handler 1630 will translate the message to the format required by the rules engine 1640 and forward the formatted message to the rules engine 1640. Upon receiving a change request message, the rules engine 1640 will invoke the associated business logic to process the request. The business logic may be designed to handle the following change requests: (1) Support staff increment logic to handle staffing increase request for a service channel. This logic should comply with the service channel priority order from high to low as follows: inbound call, e-mail, fax, outbound call, and mail. For example, for an increasing inbound call staff request, the business logic will allow resource reallocation from another service channel. For an increasing e-mail staff request, the business logic may allow the resource reallocation from another lower priority service channel. (2) Support staff decrement logic to process staff decreasing request from a service channel. This logic may be used to request staff from one service channel to support staff increment for another. (3) Use the real-time and forecasted data to calculate the number of staff that should be increased or could be decreased. (4) Consider overtime as an option for the resource allocation. (5) If more resources are required for a change request, exceptional business logic may be invoked to record the amount of required resources. (6) If there are enough resources for a change request, the logic may construct the list of notification messages referencing the current staffing & status information from resource manager. A notification message may be sent to an available SP. If a SP is not signed on, the notification may be sent to a unit manager, an operations manager, or a site manager at the SWM 4000 who is signed on and has a valid IP address. (7) Ensure the frequency of switching a SP from one service job to another service job does not exceed 4 times a day.

After the completion of the change request business logic, the rules engine 1640 will forward the notification messages to the enterprise workload dispatcher 1650 to request management approval. The workload dispatcher 1640 is responsible for delivering the notification messages. The workload dispatcher 1640 is also responsible for the guaranteed delivery of the notification messages. Upon the completion of notification messages delivery, a confirmation message may be sent to the enterprise workload monitor 1500 to complete the change request transaction.

The processing parameters for the work-item reprioritization are the same as workload distribution processing; i.e., upon receiving a reprioritization message from the enterprise inventory manager 1400, the event handler 1630 will request the corresponding plan of record from the predictive scheduler 1200 and retrieve the associated active work items summary from the enterprise inventory controller 1440. Upon receiving a reprioritization request message from the event handler 1630, the rule engine 1640 will invoke the associated business logic to process the request. The parameters for the business logic are also similar to the parameters for the workload distribution described before; i.e., the business logic are designed to send a list of reprioritized work-items to the corresponding SWM's 4000 and also to notify a list of SP's if additional resources are needed.

The enterprise workload manager 1600 produces four types of output data elements: workload notification, prioritization, distribution instructions, and business logic. The output parameters are as follows. Notification message is initiated by the enterprise workload manager 1600 to notify a SP's work acquisition manager of a work mode change. A confirmation message is required from the EWM system 1000 for the notification guaranteed delivery. Prioritization messages are initiated by the enterprise workload manager 1600 to synchronize the reprioritization between the EWM system 1000 and each SWM 4000. A confirmation message is required from the EWM system 1000 for the prioritization guaranteed delivery. Distribution instruction messages are sent by the enterprise workload manager 1600 to respond a distribution request message originated by an EWM agent 4200. A confirmation message is required from such EWM agent for guaranteed delivery. To support the high availability and integrity of the system, multiple-versions control and redline trace facilities are provided to support what-if scenario testings and to deploy correct business logic for runtime. Changes to certified business logic are propagated between primary and backup sites.

Contact History Manager

Figure 8:
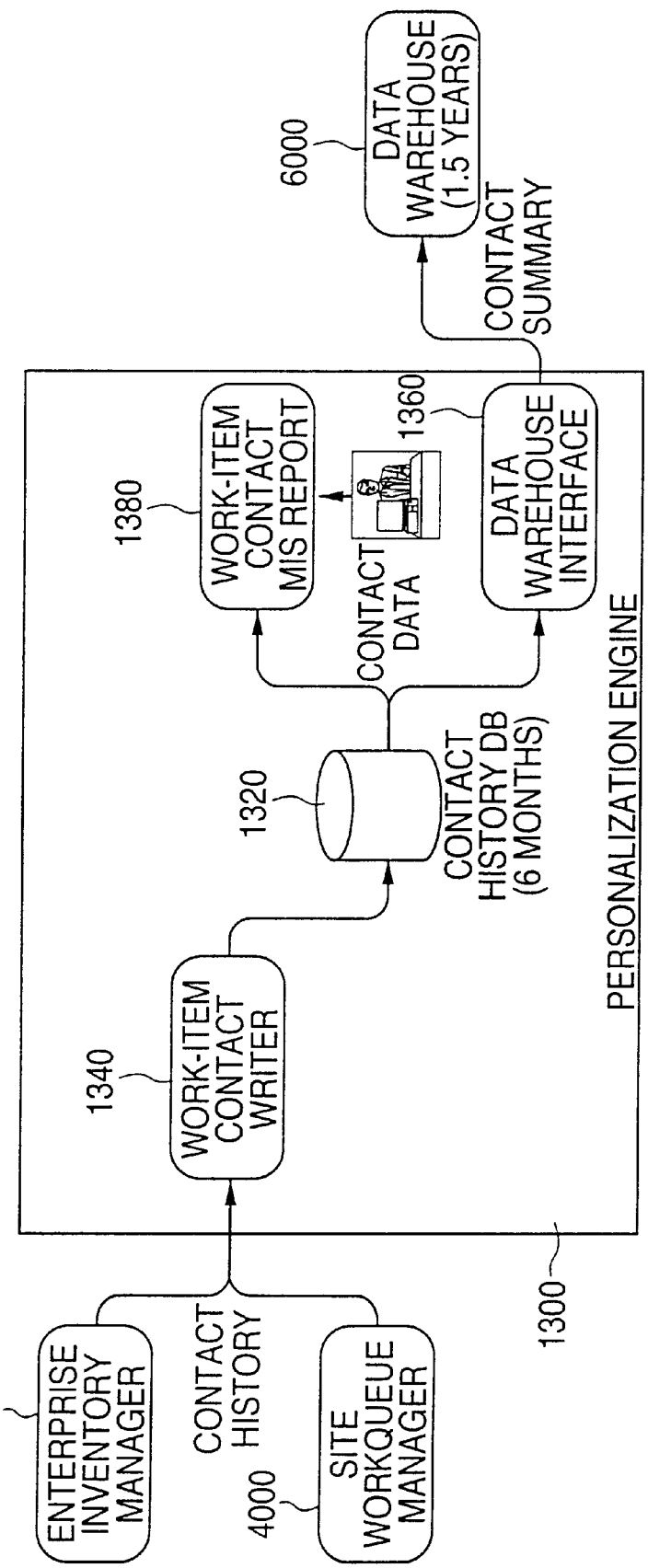
FIG. 8 depicts a contact history manager component of the EWM system in accordance to an embodiment of the present invention.

FIG. 8 depicts a functional model of the contact history manager 1300 for storing contact history for a specific customer, in accordance to an embodiment of the present invention. The Contact History Manager 1300 contains a contact history repository or database 1320, a work-item contact writer 1340, a data warehouse interface 1360, and a work-item contact MIS report 1380. The Contact History Manager receives three types of input data elements: work-item creation contacts, phone contacts (both inbound and outbound) and contact history updates. As a work item is created in the enterprise inventory manager 1400, contact history is created and sent, via the contact writer 1340 to the enterprise contact history database 1300 indexed for a specific customer. As phone contacts are initiated, the sales and servicing application must generate phone contact information as contact history messages, and such phone contact history messages are also sent to the enterprise contact history database 1300 via the contact writer 1340. Thus, customer contact history information is stored in the contact history database 1320. As work-item and call statuses are updated, contact history information is also updated. For example, as exemplified in the parameters for the enterprise inventory manager 1400, the EWM system 1000 is engineered to handle a maximum of 371,600 work items and 500,000 phone calls a day. Assuming, for example, a contact history message of 500 bytes, the data stores are then engineered to handle a minimum of 484 (or 871,600/(2*15*60)) contact messages per second. For transaction integrity, the enterprise inventory manager 1400 is responsible for delivering the contact history messages for work items and requesting confirmation from the work item contact writer 1340. If a communication failure is detected, the enterprise inventory manager 1400 is responsible for generating an alarm to alert the ECC system user or administrator along with recommended actions.

As a work item progresses through the EWM system 1000, contact history records are recorded to reflect current status of work items. Work-items will pass through at least two additional states—in progress and complete. Assuming, for example, a contact history message of 500 bytes, then the data stores are engineered to handle a minimum of 418 (or (371,600/(2*15*60))* 2) additional contact messages per second. If a communication failure is detected, the enterprise inventory controller 1440 of the enterprise inventory manager 1400 is responsible for generating an alarm to alert the ECC system user or administrator along with recommended actions.

There are two contact history processing functions, retrieve customer contact history and work-item update contact history. With regard to the contact history retrieve processing function, upon creation of a work item by the EIM 2000 a request is sent to the contact history manager 1300 to retrieve the latest contact history information about the customer from the Contact History Repository 1320. The EIM 2000 processes the data and appends any routing qualification information to the work item (e.g. priority, skill etc.). With regard to the work-item update processing functions, as the EIM 2000 transfers a work item to the SWM 4000 it creates a contact history record for the customer and sends it to the work item contact history writer 1340. While the work item is under control of the SWM 4000 and the work item changes status, the SWM formats a contact history record with the new status and forwards it to the work item contact history writer 1340. When a work-item is closed, the SWM also formats a contact history record with the status and forwards it to the work-item contact history writer 1340, wherein the latter writes the contact history record into the contact history database 1320.

The Contact History Manager 1300 produces two types of output: summarized contact history data for the data warehouse 6000 and contact history data for reporting (MIS). The contact history data is periodically summarized and sent to the data warehouse 6000, via a data warehouse interface 1360, for historical analysis. There are many users of historical contact history. Data from the contact history database 1320 is also made available for work item reporting via a work-item contact MIS report 1380 which performs similar reporting functions as done by the MIS report 1580 in the enterprise workload monitor 1500.

Site Workload Management

Figure 9:
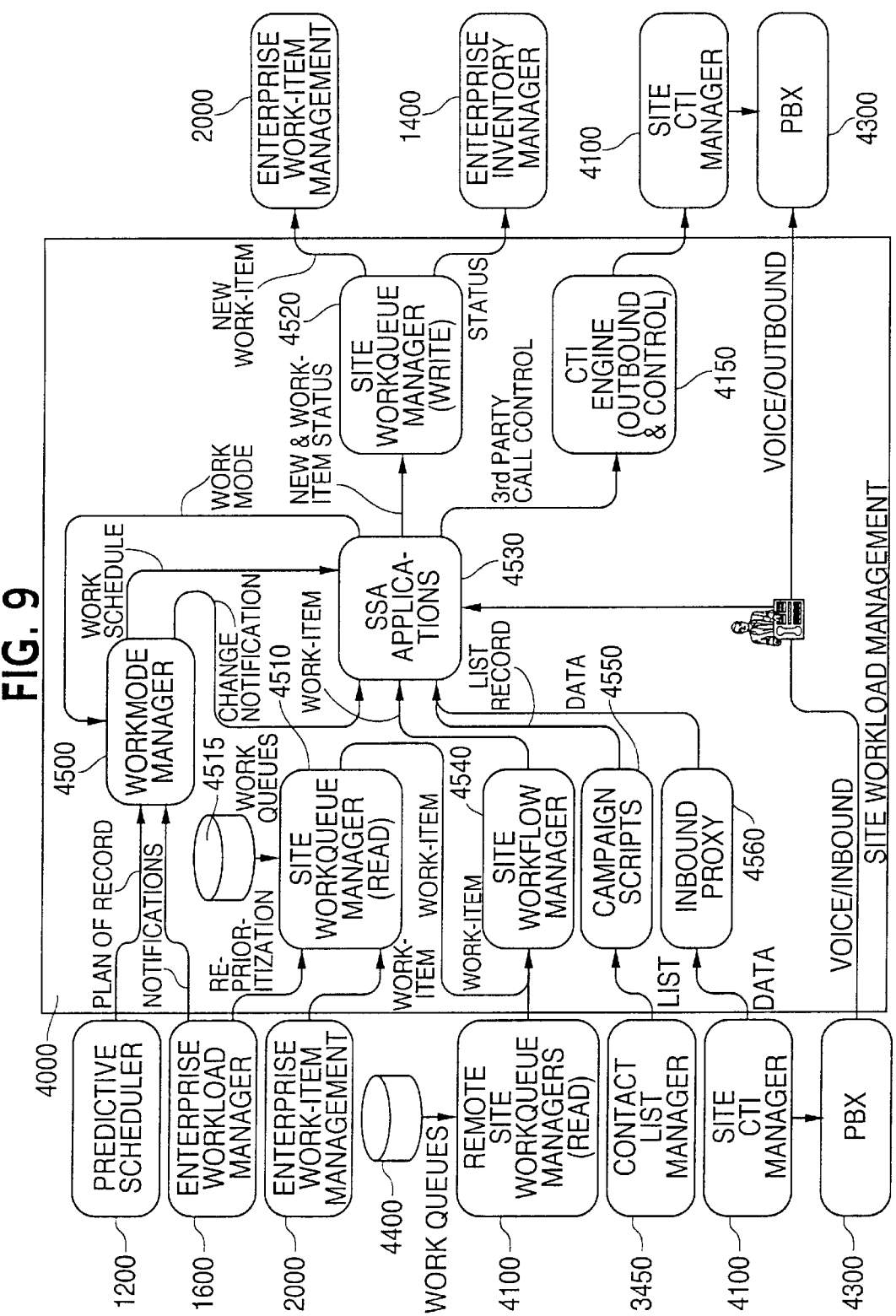
FIG. 9 depicts a functional model of a site workload management in accordance to an embodiment of the present invention.

FIG. 9 depicts a functional model of the SWM 4000 at each customer service or work site 400, in accordance to an embodiment of the present invention. The SWM 4000 comprises a workmode manager 4500, receiving site workqueue managers 4510, a forwarding site workqueue managers 4520, Strategic Service Architecture (SSA) applications 4530, a site workflow manager 4540, a campaign scripts 4550, and an inbound proxy 4560. As shown in the figure, the work mode manager 4500 receives the plan of record from the predictive scheduler 1200 and the notifications from the enterprise workload manager 1600. As described earlier, the plan of record consists of volume forecast, resources required, and staff work schedules, and the notifications are messages initiated by the enterprise workload manager 1600 to notify a SP at the work site 400, where the SWM 4000 resides, for work mode changes or the site manager for SP staff reallocation. Based on such information, the workmode manager 4500 produces a work schedule and any change notification to the SSA applications in order to perform customer service functions.

FIG. 9 shows that the enterprise workload manager 1600 also sends re-prioritization messages to the receiving site workqueue manager 4510 of the SWM 4000. As mentioned earlier, such messages are initiated by the enterprise workload manager 1600 to synchronize the reprioritization between the EWM system 1000 and all of the supporting SWM's 4000. Actual work items are also transferred by the EIM 2000 from the mailroom mega sites 400 into the SWM workqueues 4515, via the receiving site workqueue manager 4510. Based on the re-prioritization instructions, the receiving site workqueue manager 4510 then forwards the work items from the site workqueue 4515 to the site workflow manager 4540, which is responsible for balancing work assignments among service resources at its work site based on predefined prioritization rules at execution time. The site workflow manager 4540 then forwards the work item or items to the site SSA applications 4530 for the latter to perform the customer service task or tasks called for in each work item based on the work schedule and change notification that it receives from the workmode manager 4500. The SSA applications 4530 also keeps the workmode manager 4500 up to date with its work via a work mode feedback, as shown in FIG. 9. Alternatively, the site workflow manager 4540 can receive work items from remote workqueues 4400 and remote site workqueue managers 4700, whereby these remote components operate similarly to the SWM's own workqueues 4515 and site workqueue manager 4510.

The SWM 4000 also receives as input a list item into its campaign scripts 4550 as sent from a contact list manager 3450. The list contains contact information, such as names, addresses, and account information relating the customers associated with the work items being transferred from EIM's 2000 into the SWM site workqueues 4515. The campaign scripts 4550 are then used to drive the SSA applications 4530 for sales and to assist the SP in performing the above-mentioned customer service tasks.

To service inbound and outbound call customer services, a connection is made between a site CTI manager 4100 associated with each SWM 4000 and the local PBX 4300, where the calls are routed, to collect ICM and OCM real-time performance information to be routed to the enterprise workload monitor 1500, as discussed earlier. For inbound calls, such information is collected and the data forwarded to the SWM inbound proxy manager 4560 for dispatching the correct SSA application 4530. Based on change notification data from the workload manager 1600 to the workmode manager 4500, the SSA applications 4530 directs specific SP's at that work site to service particular work categories (logon on with a specific skill or logon to a specific site workqueue manager.) For outbound calls, the SSA applications 4530 log the SP onto CTI OCM 4150 functions through third-party call control. As outbound calls are connected phones, available SP's are connected to the calls through the local PBX 4300.

To provide updates to the EWM system 1000, The SSA applications 4530 outputs work-item statuses to the forwarding site workqueue manager 4520 for writing to the EIM's 2000 and the enterprise inventory manager 1400. It should be noted that the SWM 4000 may have two different site workqueue managers 4510 and 4520 for receiving and forwarding data, or a single site workqueue manager that performs both of those functions. With regard to the work-item status, it is sent to the enterprise inventory controller 1440 to indicate the state of the work item being performed by the SWM 4000 and subsequently to the Contact History Manager. With regard to the new work-item status, it is sent to the EIM's 2000 to assist the EWM agent 4200 at each EIM in constructing new work-item summary messages for sending to the enterprise inventory controller 1440.

Enterprise Work-Item Management

Figure 10:
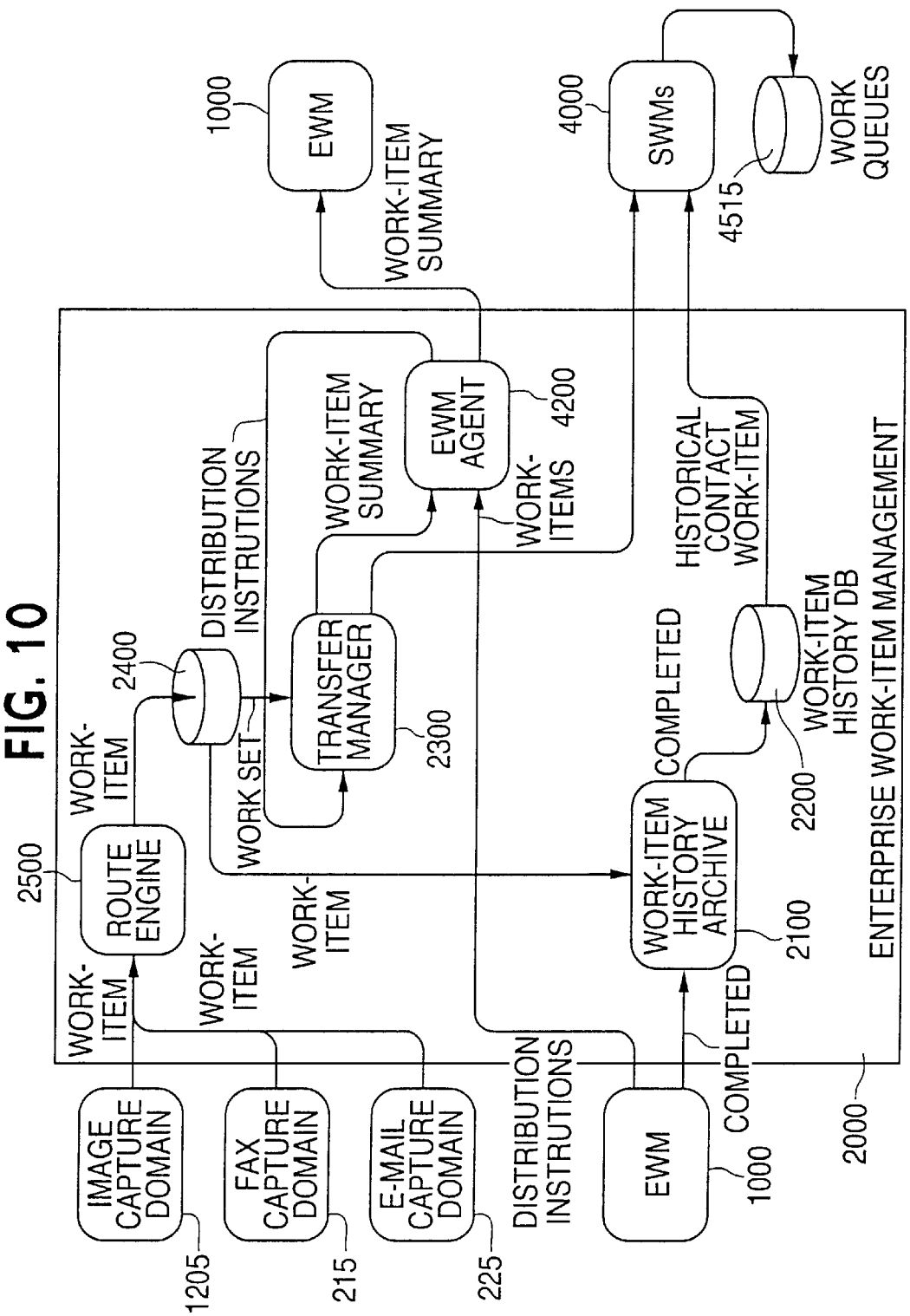
FIG. 10 depicts a functional model of an enterprise work-item management in accordance to an embodiment of the present invention.

FIG. 10 depicts a functional model of the EIM 2000, in accordance to an embodiment of the present invention. The EIM's 2000 of the EWM system design, as shown in FIG. 2, all function identically; therefore, only one is described here. The EIM 2000 comprises a work-item history archive 2100, a work-item history database 2200, a transfer manager 2300, a work set 2400, a route engine 2500, and an EWM agent 4200. Work items received by the mailroom mega site 200 where the EIM 2000 resides are scanned into electronic images by the image capture domain 205, the fax capture domain 215, and the e-mail capture domain 225. The resulting electronic work items are then forwarded to the route engine 2500 and onward to the work set 2400, where they may be reprioritized on a periodic basis, as based on age and personalization criteria, to make sure customer requests meet established service level objectives. The work items are then sent to the transfer manager 2300, where they are routed to the workqueues 4515 of an appropriate SWM's 4000 based on the distribution instructions received by the EWM agent 4200 from the EWM system 1000; more specifically, from the enterprise workload manager 1600 via the enterprise inventory manager 1400, as described earlier.

The EWM agent 4200 also sends work-item summary information to the EWM system 1000, specifically, the enterprise inventory manager 1400, as described earlier. Upon receipt of a completion message for a work-item, the enterprise inventory controller 1400 will forward the completion message to the work-item history archive 2100 of the EIM 2000 and update the contact history database 1320, and archive a copy of the work item, sent by the work set 2400, in the work-item history database 2200.

Enterprise CTI Management

Figure 11:
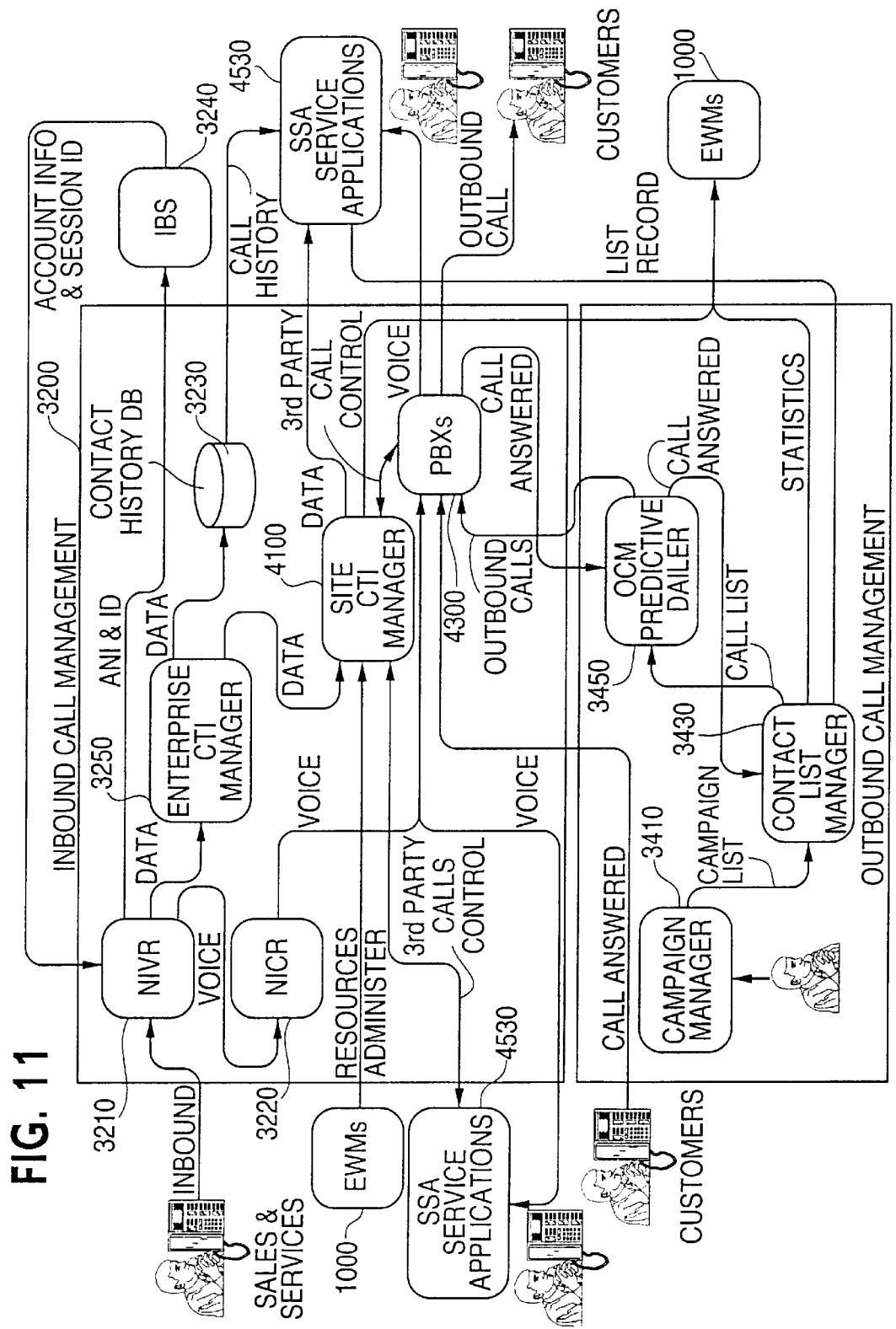
FIG. 11 depicts an enterprise computer telephone integration management in accordance to an embodiment of the present invention.

FIG. 11 depicts a functional model of the enterprise CTI management or ECM 3000, in accordance to an embodiment of the present invention, that consists of the ICM 3200 and the OCM 3400. The ICM 3200 comprises a network integrated voice response system (NIVR) 3210, a network interactive voice response (NICR) 3220, a the contact history database 3230, an enterprise CTI manager 3250, the site CTI manager 4100 at each work site 400, the local PBX 4300, and International Bankcards System (IBS) 3240. The OCM 3400 comprises a campaign manager 3410, a contact list manager or outbound list manager 3450, and an OCM predictive dialer 330.

Inbound calls are first received and processed by the NIVR 3210. Upon processing a call, the NIVR 3210 sends customer information such as customer ID and originating automatic number identification (ANI) to a comprehensive central database, e.g., IBS 3240, which then returns such customer information back to the NIVR 3210 to create a data unit record to be forwarded to the enterprise CTI manager 3250. The Data record is then sent to the Contact History Database 3230 and the site CTI manager 4100. At the same time, the inbound voice call is also transferred from NIVR 3210 to the NICR 3220, which provides more capability in terms of applying routing rules to the call, such as for holding, redirecting, and rerouting calls in various situations. After being manipulated by the NICR 3220, the inbound voice call is routed to the local PBX 4300, where it is then routed to the appropriate SP. In concert with routing the call, the Enterprise CTI Manager sends the Data record associated with the call to the appropriate site CTI manager 4100. As mentioned before, a connection is made between the site CTI manager 4100 and the local PBX 4300 to collect ICM and OCM real-time performance information. Based on the resources administered by the EWM system 1000, as described in the functional description of the resource manager 1100, the site CTI manger 4100 then sends the data to the SSA application at the SP's workstation 4530, wherein the SSA application directs the SP to service the particular work categories as described in functional description of the site workload management.

Outbound calls, on the other hand, are initiated by Campaign Manager 3410 which sends a campaign list to the Contact Manager 3430 at the work sites 400 to achieve business objectives, such as sales and marketing, of the financial institution. The Contact Manager 3420 sends each outbound call to the OCM Predictive Dialer 3450 which in turn paces the calls sent to the local PBX 4300 to be placed on the Public Switched Telephone network to the chosen customer(s). As described earlier, the contact list manager 3450 also provides the EWM system 1000, specifically, the enterprise workload monitor 1500, with outbound contact list performance data.

Although the invention has been described with reference to these preferred embodiments, other embodiments can achieve the same results. Variations and modifications of the present invention will be apparent to one skilled in the art, and the above disclosure is intended to cover all such modifications and equivalents.

What is claimed is:

1. A method for strategic services enterprise workload management, comprising:
   maintaining a repository of enterprise resources information for a plurality of service professionals in a plurality of service channels;
   receiving work performance information for the service professionals;
   maintaining a repository of historic work performance information for the service professionals;
   receiving information related to new and active work items for the service professionals;
   maintaining a repository of summary inventory of the new and active work items;
   maintaining a repository of contact context information related to the new and active work items;
   automatically generating work schedules for the service professionals according to pre-defined forecasted demand and an enterprise business calendar and based at least in part on information from the repository of enterprise resources information and the repository of historic work performance information;
   automatically balancing assignments among the service channels according to pre-defined prioritization parameters and based at least in part on information from the repository of enterprise resources information, the automatically generated work schedules, information from the historic repository of work performance, and information from the repository of summary inventory of the new and active work items;
   reallocating the service professional enterprise resources according to the balanced work assignments; and
   generating a process improvement report based on information from the repository of context information.

2. The method of claim 1, wherein the enterprise resources information includes detailed information about a skill set possessed by each of the service professionals.

3. The method of claim 1, wherein receiving work performance information for the service professionals includes receiving up-to-date work mode changes for each of the service professionals, and maintaining the repository of enterprise resources information includes editing the repository of enterprise resources directory in accordance to the received up-to-date work mode changes.

4. The method of claim 1, wherein maintaining a repository of historic work performance information for the service professionals includes maintaining the historic work performance information in at least quarter-hourly and half-hourly historical data segments.

5. A system for strategic services enterprise workload management, comprising:
   a resource manager for maintaining a repository of enterprise resources information for a plurality of service professionals of an organization;
   a workload monitor for receiving the resources information from the resource manager and maintaining a repository of historic work performance information for the service professionals;
   an inventory manager for receiving information related to new and active work to items for the service professionals, receiving inventory update information from the workload monitor, and maintaining an inventory of the new and active work items;
   a predictive scheduler for receiving the historic work performance information from the workload monitor and creating work schedules for the service professionals based at least on the historic work performance information;
   a workload manager for receiving at least a plan of record from the predictive scheduler, generating workload notifications and prioritization, and generating distribution instructions for the new and active work items; and
   a contact history manager for receiving contact history information from the inventory manager and sending the contact history information to a remote data warehouse.

6. The system of claim 5, wherein the historic work performance information is based at least on the resources information received from the resource manager.

7. The system of claim 5, wherein the inventory manager further includes a repository of summary inventory of the new and active work items.

8. The system of claim 5, wherein the resource manager comprises:
   a resource database for maintaining the repository of enterprise resources information.

9. The system of claim 5, wherein the resource manager comprises:
   a status update broker for updating the enterprise resources information in the resource database.

10. The system of claim 5, wherein the resource manager comprises:
   a resource editor for editing the enterprise resources information in the resource database.

11. The system of claim 5, wherein the resource manager comprises:
   a resource information provider for providing database retrieval services to at least the predictive scheduler.

12. The system of claim 5, further comprising:
   a plurality of work sites for performing the new and active work items in accordance to at least the distribution instructions generated by the workload manager.

13. The system of claim 5, further comprising:
   a plurality of work-item management sites for receiving the distribution instructions from the workload manager.

14. The system of claim 13, wherein each of the work-item management sites comprises:
   an enterprise workload management (EWM) agent for receiving the distribution instructions from the workload manager;
   a route engine for gathering work items received by the each of the work-item management sites;
   a transfer manager for generating summary information about the work items received by the each of the work-item management sites.

15. The system of claim 14, wherein the EWM agent receives the distribution instructions from the workload manager via the inventory manager.

16. The system of claim 14, wherein the EWM agent receives the work-item summary information from the transfer manager.

17. The system of claim 16, wherein the EWM agent forwards the work-item summary information to the inventory manager.

* * * * *

UNITED STATES PATENT AND TRADEMARK OFFICE
CERTIFICATE OF CORRECTION

PATENT NO. : 6,574,605 B1  
DATED : June 3, 2003  
INVENTOR(S) : Barbara Sanders, Curtis Robb and Jet Gau It is certified that error appears in the above-identified patent and that said Letters Patent is hereby corrected as shown below:

Title page,  
Item [57], ABSTRACT,  
Line 9, please change "customer, chooses" to -- customer chooses --

Column 32,  
Line 40, please remove the word "to" so that the line reads "new and active work items for the service"

Signed and Sealed this

Twenty-sixth Day of April, 2005

JON W. DUDAS  
*Director of the United States Patent and Trademark Office*